(12) United States Patent
Briel et al.

(10) Patent No.: US 7,310,613 B2
(45) Date of Patent: Dec. 18, 2007

(54) DATA MANAGEMENT SYSTEM

(75) Inventors: John V Briel, Fair Haven, NJ (US); William R Brook, Warwick (GB); Stephen I Daleman, Belle Mead, NJ (US); John D Gabbe, Little Silver, NJ (US); Kenneth A Lang, Belmar, NY (US); John A Wojciechowski, Jr., Chester, NJ (US); Paul Muschamp, Ihadleigh (GB); Lindsay A Campbell, Orkney (GB); David R Griffiths, Woodbridge (GB); Brian R Henderson, Swanley (GB); Michael Hodgson, Newark-On-Trent (GB); Jonathan Legh-Smith, San Jose, CA (US); Vineet Mittal, Somerset, NJ (US)

(73) Assignees: British Telecommunications Public Limited Company, London (GB); AT&T Corporation, Middleton, NJ (US)

( * ) Notice: Subject to any disclaimer, the term of this patent is extended or adjusted under 35 U.S.C. 154(b) by 0 days.

(21) Appl. No.: 09/980,636

(22) PCT Filed: Apr. 5, 2001

(86) PCT No.: PCT/GB01/01563

§ 371 (c)(1),
(2), (4) Date: Aug. 29, 2002

(87) PCT Pub. No.: WO01/75643

PCT Pub. Date: Oct. 11, 2001

(65) Prior Publication Data
US 2003/0110073 A1 Jun. 12, 2003

(51) Int. Cl.
*G06F 17/30* (2006.01)

(52) U.S. Cl. .................................................... 705/27
(58) Field of Classification Search .................. 705/26, 705/27, 28
See application file for complete search history.

(56) References Cited

U.S. PATENT DOCUMENTS 5,604,892 A    2/1997   Nuttall et al.

(Continued)

OTHER PUBLICATIONS

Strassner et al, "Draft-ietf-policy-core-schema-03.txt,"Policy Framework Core Information Model, May 17, 1999.

(Continued)

*Primary Examiner*—Ronald Laneau
(74) *Attorney, Agent, or Firm*—Nixon & Vanderhye P.C.

(57) ABSTRACT

A system comprises an input for product selection data; a marketplace product store for storing marketplace product definitions; a product selection store for storing data defining a selection of one or more products from the marketplace product store; an enterprise capability store for storing data defining capability of an enterprise in relation to supply of one or more products; and a product fulfillment data store for storing one or more product descriptions. At least one link is generated between each product description in the product fulfillment data store to data stored in the enterprise capability store, and at least one link is generated between each product description in the product fulfillment data store to data stored in the product selection store. The links are determined by a requirement in the respective product description for specified data in the enterprise capability store and the product selection store, such that a valid product description is dependent on presence of the specified data.

22 Claims, 12 Drawing Sheets

U.S. PATENT DOCUMENTS

| | | | |
|---|---|---|---|
| 5,890,137 A * | 3/1999 | Koreeda | 705/26 |
| 5,897,622 A * | 4/1999 | Blinn et al. | 705/26 |
| 5,974,418 A * | 10/1999 | Blinn et al. | 707/100 |
| 6,125,353 A * | 9/2000 | Yagasaki | 705/27 |
| 6,128,600 A * | 10/2000 | Imamura et al. | 705/27 |
| 6,167,378 A * | 12/2000 | Webber, Jr. | 705/8 |
| 6,754,636 B1 * | 6/2004 | Walker et al. | 705/26 |
| 2001/0047306 A1 * | 11/2001 | Garretson | 705/26 |
| 2001/0056377 A1 * | 12/2001 | Kondoh et al. | 705/26 |
| 2002/0013760 A1 * | 1/2002 | Arora et al. | 705/37 |
| 2002/0032638 A1 * | 3/2002 | Arora et al. | 705/37 |
| 2002/0082932 A1 * | 6/2002 | Chinnappan et al. | 705/26 |

OTHER PUBLICATIONS

Distributed Management Task Force, Inc., "Common Information Model (CIM) Specification", Version 2.2., Jun. 14, 1999.

* cited by examiner

DATA MANAGEMENT SYSTEM

This application is the US national phase of international application PCT/GB01/01563 filed Apr. 5, 2001 which designated the U.S.

BACKGROUND

1. Field

The present invention relates to a data management system. It finds particular application in supporting the provision of products or services by one or more enterprises.

2. Description of Related Art

An information model is a model that describes the way that information, comprising data and rules, is defined, maintained, and used. Information models are known in systems for the provision of products and services.

A good information model can facilitate effective and efficient intra-working and inter-working. Intra-working in this context refers to the way that computer applications are organised and linked together within the context of a single enterprise. Inter-working refers to a structured means for those enterprises to work in a co-operative manner. The information model controls the way in which a system responds to a request for a service or product, and manages that response.

SUMMARY OF EXEMPLARY NON-LIMITING EMBODIMENTS

According to a first aspect of the present invention, there is provided a data management system, for use in receiving and processing data in relation to one or more products, and recording fulfillment in respect of a generated product description, the system comprising:
  an input for product selection data;
  a marketplace product store for storing marketplace product definitions;
  a product selection store for storing data defining a selection of one or more products from the marketplace product store;
  an enterprise capability store for storing data defining capability of an enterprise in relation to supply of one or more products; and
  a product fulfillment data store for storing one or more product descriptions;

wherein there is further provided means to generate at least one link between each product description in the product fulfillment data store to data stored in the enterprise capability store, and at least one link between each product description in the product fulfillment data store to data stored in the product selection store said links being determined by a requirement in the respective product description for specified data in the enterprise capability store and the product selection store, such that a valid product description is dependent on presence of said specified data.

According to a second aspect of the present invention, there is provided a method of managing data relating to product provision in relation to supporting capabilities, which method comprises:
  storing marketplace product definitions in a marketplace product store;
  receiving product selection data in relation to stored marketplace product definitions;
  storing data defining a selection of one or more products from the marketplace product store in a product selection store, in response to one or more received inputs;
  storing data defining capability of an enterprise in relation to supply of one or more products in an enterprise capability store;
  storing one or more product descriptions in a product fulfillment data store; and
  generating at least one link between each product description in the product fulfillment data store to data stored in the enterprise capability store;

wherein said at least one link is determined by a requirement in the respective product description for specified data in the enterprise capability store, such that a valid product description is dependent on presence of said specified data.

A major driver for embodiments of the present invention is to improve the responsiveness and flexibility of systems to create, implement, and support telecommunications products and services in an environment characterised by rapid change and diversity.

BRIEF DESCRIPTION OF THE DRAWINGS

An information model and aspects of a management system built according to the information model are described below, as embodiments of the present invention, by way of example only, with reference to the accompanying drawings in which.

DETAILED DESCRIPTION OF EXEMPLARY NON-LIMITING EMBODIMENTS

In the Figures and text below, the identifier "IA" is occasionally used. This stands for "Information Architecture" and is intended to mean the same as the information model.

Figure 1:
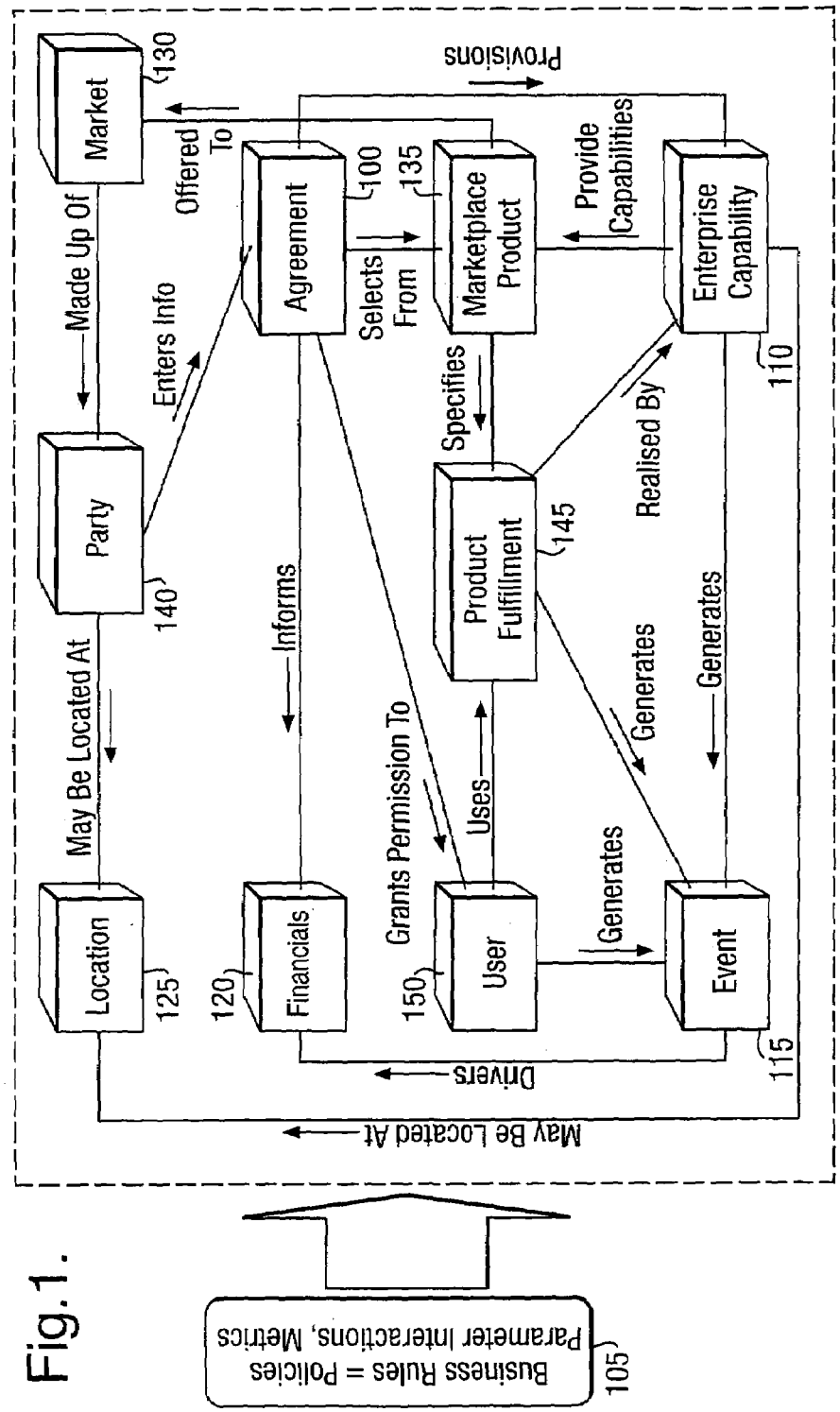
FIG. 1 shows an overall layout for the model.

Referring to FIG. 1, an information model supporting embodiments of the present invention shows the following areas of information ("concepts") that are fundamental to the operation of an enterprise, together with the dependencies between them which determine how the management system behaves in use.

Agreement 100

The information needed to support a formal or informal agreement between two or more parties.

Rules 105

These may describe the policies enacted by concepts, the interactions between their parameters, or the metrics applied when measuring their performance Enterprise Capability 110

Enterprise Capability represents the information pertaining to what the enterprise is capable of delivering.

Event 115

Event represents the information pertaining to an occurrence of a happening at a point in time—a change of state with which the enterprise is concerned and the way in which these events are handled.

Financials 120

Financials represents any information concerning money or the management of money that is of interest to the enterprise.

Location 125

Location represents any place, area or position that is of interest. It represents the information needed to answer the question of where something is, whether geographical or perhaps in an organisation or otherwise.

Market 130

Market represents the information about the environment in which the enterprise is selling, leasing or renting its marketplace products and the activities undertaken to engage with these environments.

Marketplace Product 135

Marketplace Product represents the information about product offerings made to the marketplace and their selection. (Please note that in the claims of this specification, the phrase "product definition having associated price data" is a reference to the Marketplace Product.)

Party 140

Party represents information about an individual or organisation and the many roles that they can take.

Product Fulfilment 145

Product Fulfilment represents information relating to the fulfilment of a product selection.

User 150

The User concept represents an entity that is authorised by an Agreement to register with and use the Product Fulfilment covered by the Agreement. That entity may be an individual, a user group, an organisation, or a system element.

The following describes the relationships between the areas of information in use of an associated data management system.

Parties 140 (individuals or organisations) enter into Agreements 100 with one another. When they do so they take on a role such as customer, supplier, distributor, etc. Parties may be located at Locations 125.

The enterprise offers Marketplace Products 135 to the Market 130. Parties 140 belong to a market segment within the Market 130. The customer (a Party140 assigned a role within an Agreement 100) will make selections from the options available as Marketplace Products 135 via the Agreement 100 (defined in the data management system by an agreement definition). Selections made by a Party 140 from marketplace products 135 specify what is provided for Users 150 and what is embodied in the Product Fulfilment 145. The Agreement 100 grants permissions to the Users 150 as to how they use the Product Fulfilment 145. As further discussed below, Parties 140 and Users 150 are defined and dealt with independently.

All Marketplace Products 135 are based on the Enterprise Capability 110. The Product Fulfilment 145 must therefore be realised by the Enterprise Capability 110. In order to direct the capabilities of the enterprise to the Product Fulfilment 145, the Agreement 100 may provision the Enterprise Capability 110. The components that make up the Enterprise Capability 110 may be located at a Location 125. Note that a User 150 may be either human (i.e. a Party 140) or non-human (i.e. a component of the Enterprise Capability 110).

Events 145 are occurrences in which the enterprise is interested. Users 150 may generate Events 115. The components that make up the Enterprise Capability 110 may also generate Events 115. Events 115 may also be changes of state to the Product Fulfilment 145, such as usage, with which the enterprise is concerned. Some Events 115 are chargeable and may give rise to financial transactions, such as debits and credits, which may contribute to an invoice. The Agreement 100 also informs the Financials 120 as to price policies, payment methods, invoice policies, etc.

Rules 105 are applied to all concepts. These may describe the policies enacted by concepts, the interactions between their parameters, or the metrics applied when measuring their performance.

A data management system based on the above areas of information and their dependencies in use of the system displays several functionalities which are advantageous. In particular, the way in which the following areas of information are structured and interrelated provides advantageous behaviour of the system in use:

parties, organisational construction, and the use of roles
  the construction and selection of marketplace products, their fulfilment and the link to the enterprises capabilities
  user/customer separation and the relationship of a user with a service fulfilment Model Background The above three areas are discussed in greater detail below. However, background to the model is as follows.

The information model is based on object-oriented software engineering. However, the information classes can be treated simply as data containers. In that case, the 'methods' applicable to the classes become the four methods known as CRUD: create—establishing an instance of the class; read—retrieving the values of the attributes of the instance;

update—changing one or more values of the attributes of the instance; and delete—removing the instance of the class.

Figure 2:
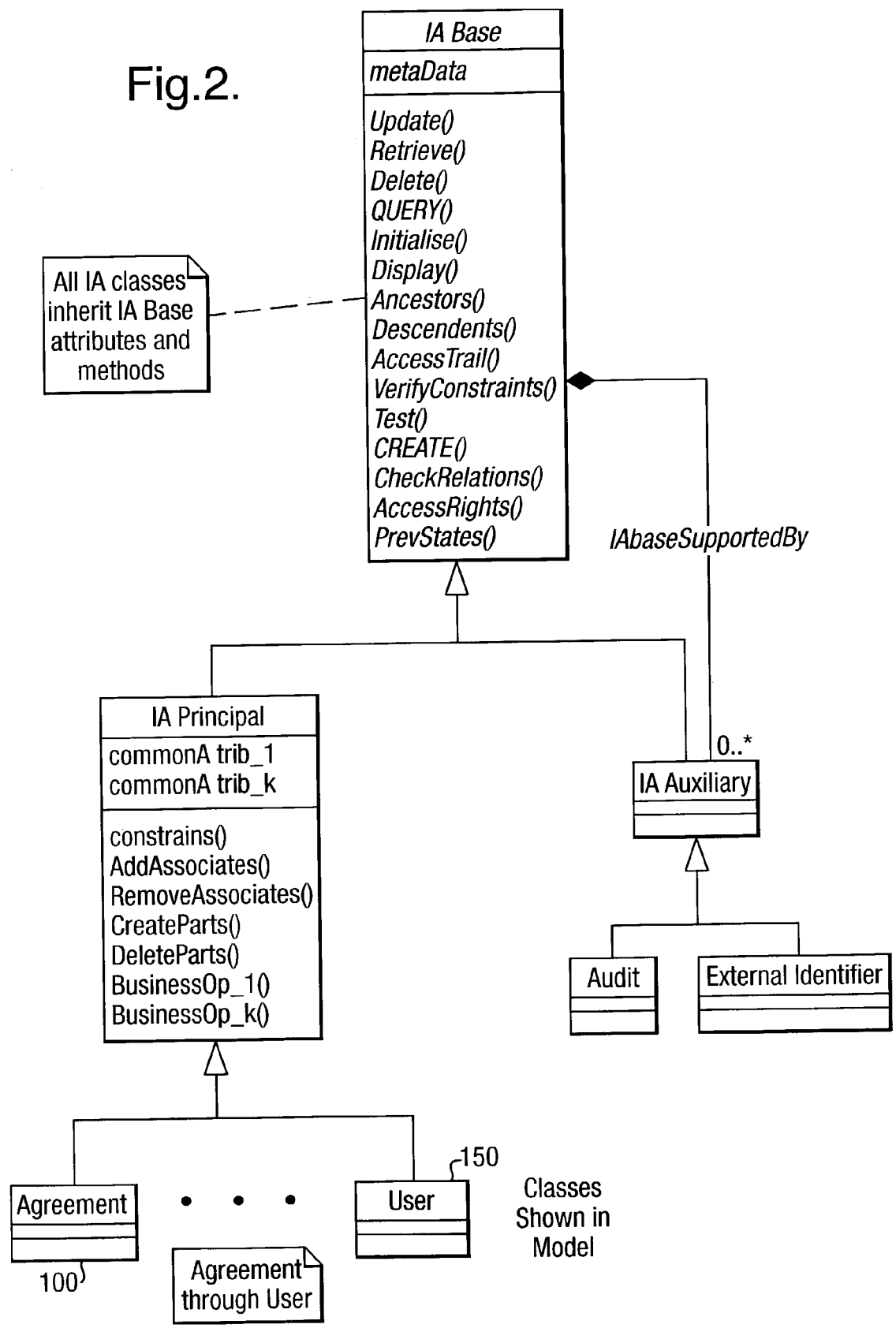
FIG. 2 shows a base class for the model.

Referring to FIG. 2, each of the classes inherits common data management metadata and methods to create, read, update, and delete.

The focus of the model is on the principal classes that represent the entities, events, and processes of an enterprise. However, it must also take into account the data, methods, and classes that give an implementation effort the proper guidance on combining operational aspects with the principal classes to form a realized information system.

To include the operational aspects, the information model employs the technique of defining a root class from which all classes of the model inherit the common data management metadata and methods to create, read, update, and delete (CRUD). The root class, known as the IA Base class 200, has two sub-classes. One sub-class, the IA Principal class 205, is the root for the modelled information model classes, such as Agreement and User, and contains any common business attributes and methods that would be used across the visible information model classes. The other sub-class, the IA Auxiliary class 210, permits classes for audits, mapping external identifiers, etc. to be defined and associated with the IA Base 200 and, thus, be defined consistently across the entire model.

Each modeled class, Agreement through User 215, inherits from the IA Base class 200 and IA Principal class 205 and adds its own business attributes and business methods. This keeps the model focused on capturing the business classes, methods, and relationships. The IA Base class 200 is assumed to be always present.

The model uses the known Unified Modeling Language (UML) as its syntax. An explanation of the UML syntax, and extensive overview of UML, can be found in "A guide to the UML Standard Notation" published on the Internet by the Rational Software Corporation at http://www.rational.com/uml.

Pattern Classes and Relationships in the Model

Particular pattern classes and relationships that are found in the model are:

Policy pattern class (indicated by <<Policy>>)
Parameter-defined pattern class (indicated by <<Parameter Defined>>) including class-to-class Interaction.
Interaction pattern relationship (indicated by <<Interaction>>)
Role Assignment pattern relationship (indicated by <<RoleAssignment>>)

A pattern class or relationship represents a group of classes fitting an enumerated pattern. The patterns are used to make the model easier to read. The most important of those mentioned here, for the purpose of embodiments of the present invention, is the role assignment pattern relationship.

Policy Pattern Class (Indicated by <<Policy>>)

The policy definition which the information model uses is based upon the Policy Framework defined by the Internet Engineering Task Force (IETF). (See the IETF Policy Reference Model published for instance on the Internet at http://www.ietf.org/html.charters/policy-charter.html.)

Figure 13:
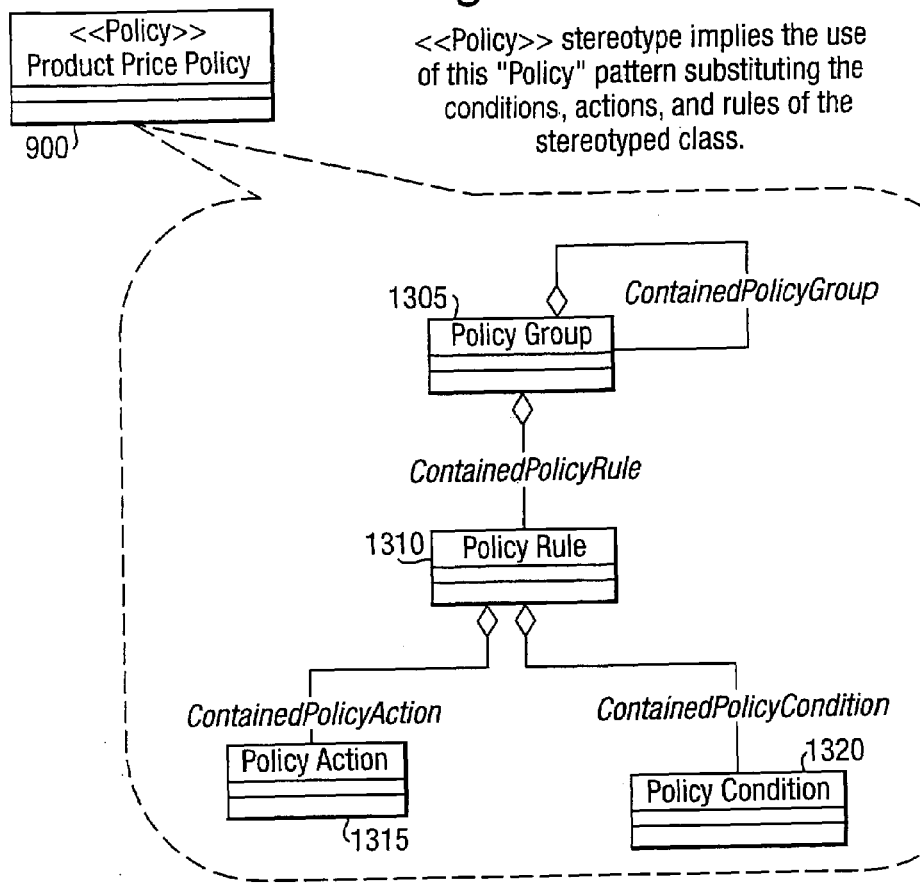
FIG. 13 shows a policy pattern for use in the information model.

Referring to FIG. 13, a policy 1300 is applied using a set of policy rules 1310. Each policy rule 1310 consists of a set of conditions 1320 and a set of actions 1315. The set of conditions 1320 associated with a policy rule 1310 specifies when the policy rule is applicable. Policy rules 1310 may be aggregated into policy groups 1305. These groups may be nested, to represent a hierarchy of policies 1300.

If the set of conditions 1320 associated with a policy rule 1310 evaluates to TRUE, then the set of associated actions are executed. For the set of actions associated with a policy rule 1310, it is possible to specify an order of execution, as well as an indication of whether the order is required or merely recommended. It is also possible to indicate that the order in which the actions are executed does not matter.

Policy rules 1310 themselves can be prioritized. One common reason for doing this is to express an overall policy that has a general case with a few specific exceptions.

Policies 1300 can either be used in a stand-alone fashion or aggregated into policy groups 1305 to perform more elaborate functions. Stand-alone policies 1300 are called policy rules 1310. Policy groups 1305 are aggregations of policy rules 1310, or aggregations of policy groups 1305, but not both. Policy groups 1305 can model intricate interactions between objects that have complex interdependencies. Examples of this include a sophisticated user logon policy that sets up application access, security, and reconfigures network connections based on a combination of user identity, network location, logon method and time of day. Stand-alone policies 900 are those that can be expressed in a simple statement. Examples of this are VLAN assignments, simple YES/NO QoS requests, and IP address allocations.

Figure 3:
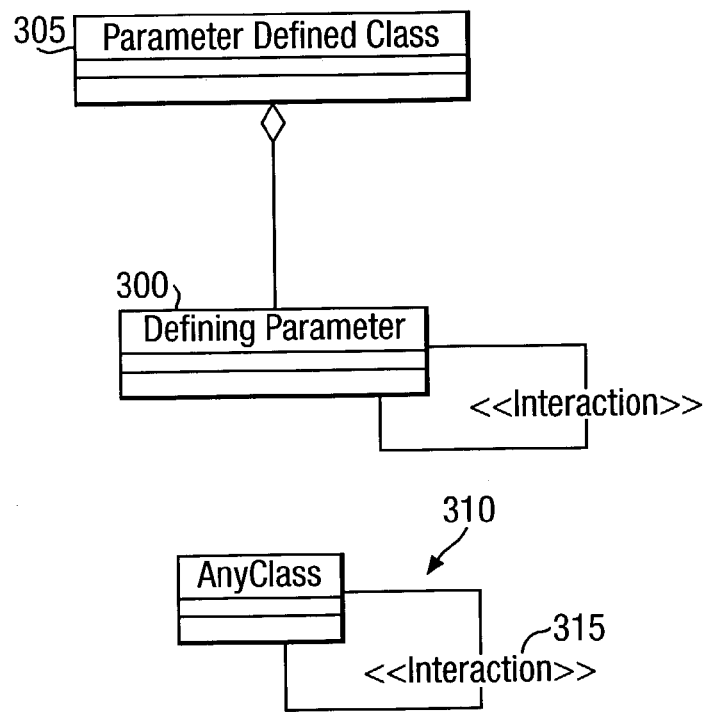
FIG. 3 shows parameter defined classes and interactions in the model.

Parameter-defined Pattern Class (Indicated by <<Parameter Defined>>) Including Class-to-Class Interaction Referring to FIG. 3, a parameter defined class 305 is a complex type of class hierarchy used in the model. It is an aggregation of a set of Defining Parameters 300. Each Defining Parameter 300 describes a particular feature of the Parameter Defined Class 305. There may be any number of Defining Parameters contributing to the Parameter Defined Class. It is modeled in this way to allow maximum flexibility in the way in which the capabilities of the Parameter Defined Class are built.

Each of the Defining Parameters 300 may interact with one or more of the other Defining Parameters. The <<Interaction>> relationship pattern 310 defines the nature of this interaction.

Interaction Pattern Relationship (Indicated by <<Interaction>>)

Referring still to FIG. 3, there are a number of classes in the model in which the objects of a class may have interactions with other objects of the same class. This interaction is indicated with the class having a relationship to itself and stereotyping the relationship as an "Interaction" 315. This would appear for any class of the model as shown in FIG. 3.

Figure 4:
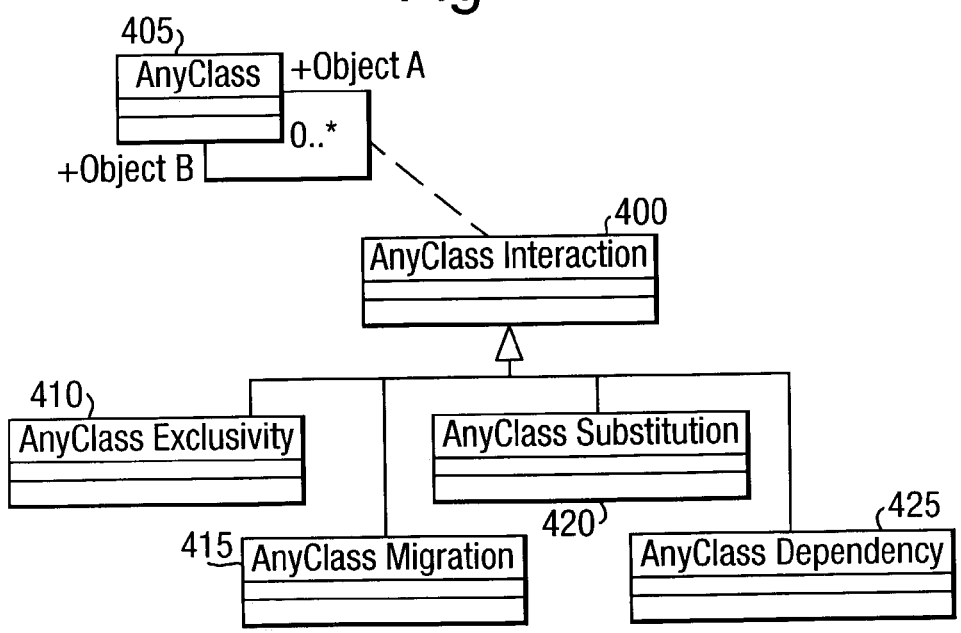
FIG. 4 shows an interaction stereotype for use in the model.

The Interaction stereotype 315 represents an associative class and its sub-classes that capture the types interactions and their details. It communicates the existence of these classes without having the clutter distracting from the more important aspects of the model. Referring to FIG. 4, the Interaction stereotype is used in the model as a short hand to indicate the presence of the pattern of classes and relationships as shown.

In this pattern, the AnyClass Interaction 400 captures the interaction details between Object A and Object B of the AnyClass 405. The interaction is not mandatory—it is permissible that an object within AnyClass does not have any interaction other objects within AnyClass.

Sub-classes are used to enumerate the types of interactions supported. The interaction types enumerated are not the comprehensive list of possible interactions. The sub-classing serves as the addendum point at which other interactions are to be added as they are discovered. The sub-classes of the AnyClass Interaction include the following:

AnyClass Exclusivity 410—defining a mutually exclusive relationship between AnyClass Object A and Object B.

AnyClass Migration 415—defining a migration of AnyClass Object A to Object B.

AnyClass Substitution 420—defining a substitution of AnyClass Object A for Object B.

AnyClass Dependency 425—defining a dependency of AnyClass Object A on Object B.

Role Assignment Pattern Relationship (Indicated by <<RoleAssignment>>)

Figure 5:
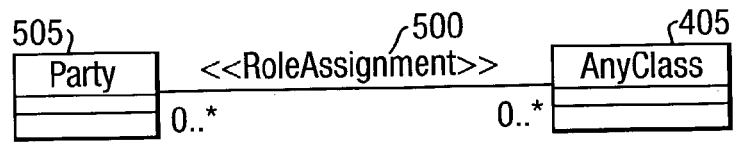
FIG. 5 shows role assignment for a party in the model.

Referring to FIG. 5, there are many classes in the model in which Parties are assigned to a responsibility associated with that class. The responsibilities associated with a class are captured by the roles for the class. This is indicated with Class 405 having a relationship to Party 505 and stereotyping the relationship as a "RoleAssignment" 500. This would appear for any class in the model.

Figure 6:
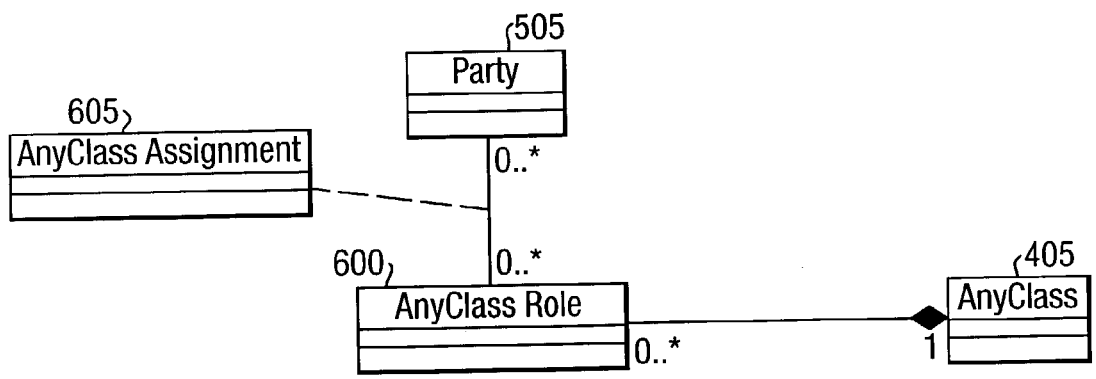
FIG. 6 shows further details of role assignment according to FIG. 5.

Referring to FIG. 6, the RoleAssignment stereotype 500 represents a set of classes and relationships that capture the AnyClass ownership of roles and the assignment of Parties to those roles. In this pattern, AnyClass 405 refers to any class in the model. An object within AnyClass 405 may have zero or more roles defined with it. The roles are captured in the AnyClass Role class 600. An object of the AnyClass Role class 600 can be associated with one and only one object in AnyClass 405. A Party may be associated to zero or more roles in AnyClass Role 600. A role may have zero or more Parties 505 associated with it. Each Party/role relationship is an Assignment 605 that has its own descriptive attributes, such as start date, end date, type (temp/permanent), and status (inactive, active). The assignment and role are dependent on the AnyClass 405. That is, if an object in AnyClass 405 is deleted, its associated roles and assignments are meaningless and should be deleted.

Figure 7:
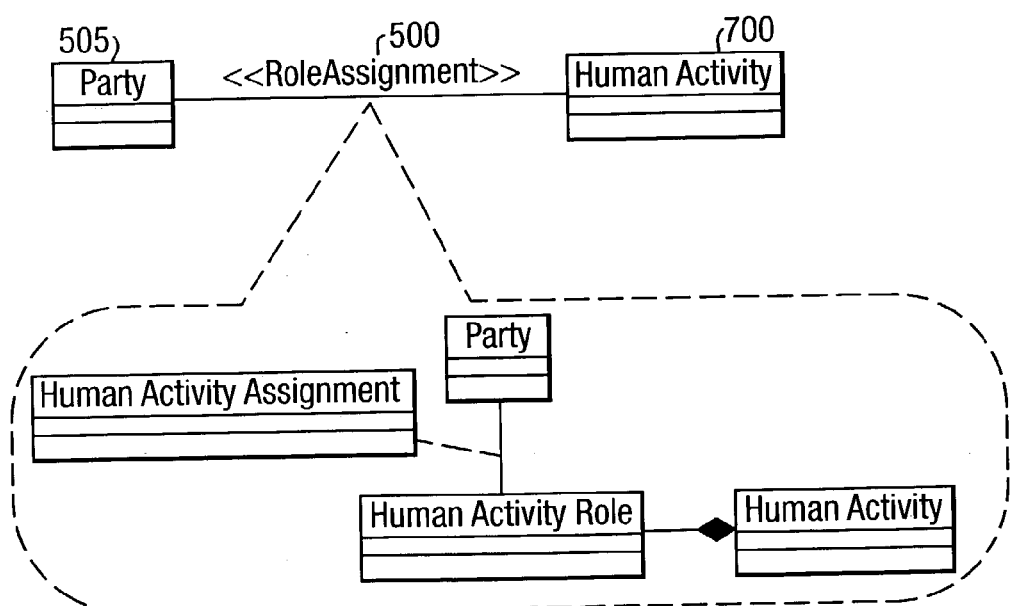
FIG. 7 shows a role assignment pattern for use in the model.

Referring to FIG. 7, as an example, there may be a role assignment pattern that is formed for the relationship between Party 505 and Human Activity 700. The relationship is labeled with the stereotype of <<RoleAssignment>> 500. The naming convention for the specific classes of this pattern is to substitute the name of the role owning class for AnyClass 405. Thus, by substituting "Human Activity" for Anyclass for all the classes in the pattern, the model segment shown in FIG. 7 is implied.

Parties, Organisational Construction, and the Use of Roles

Figure 8:
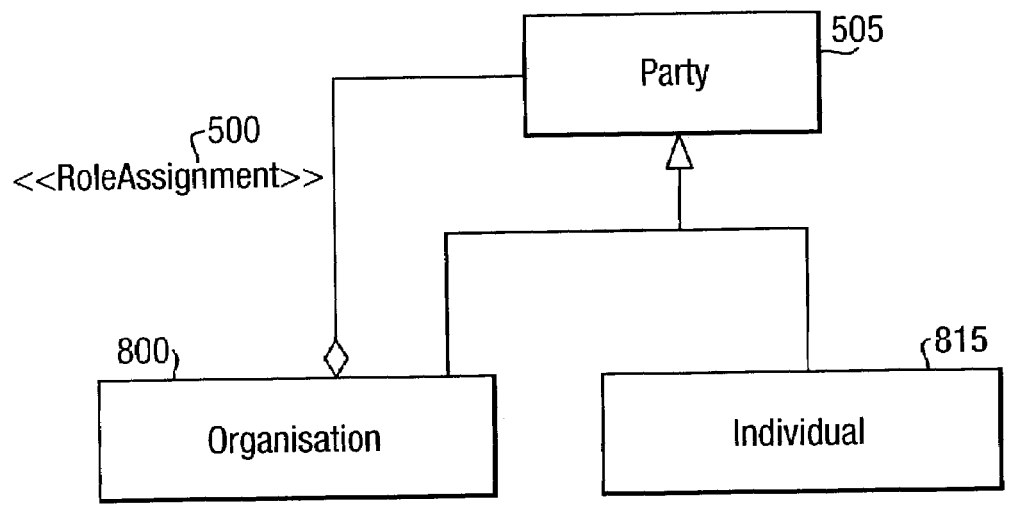
FIG. 8 shows how parties are defined in the context of an organisation using a role assignment stereotype.

FIG. 8 shows how parties 505 are defined in the context of an organisation 800, including the use of the <<RoleAssignment>> stereotype 500.

Figure 9:
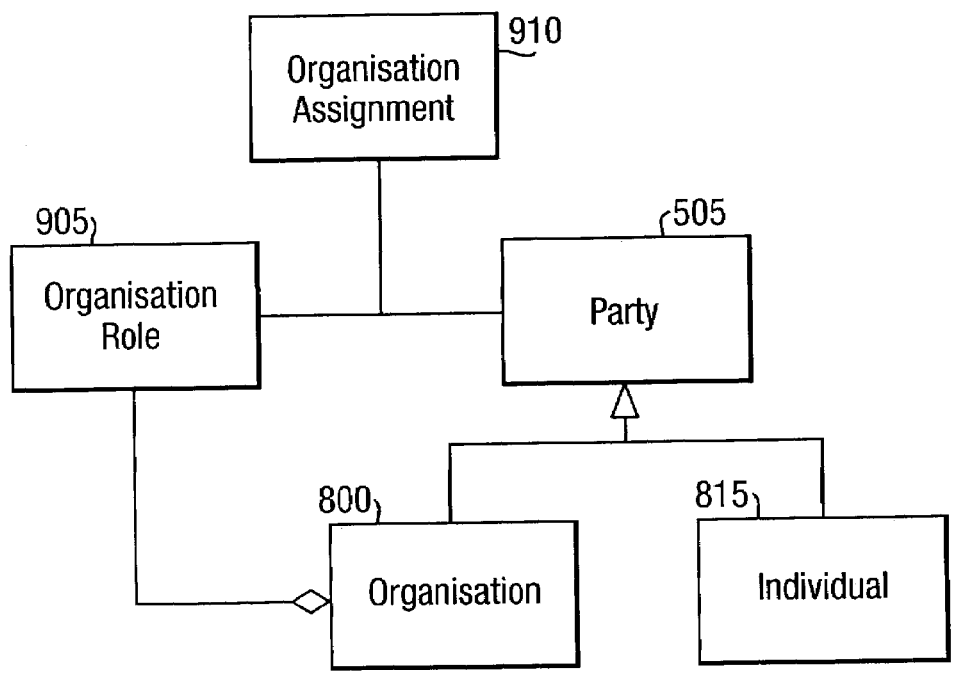
FIG. 9 shows an object structure for defining parties, organisations and role assignment in that construction.

FIG. 9 shows the <<RoleAssignment>> stereotype 500 expanded. The object structures show how parties 505 are defined in the context of an organisation 800, the way in which organisations 800 are constructed and the way in which parties 505 are assigned to roles 905 within that organisation 800. The Organisation class 800 holds the data about a group. The Individual class 815 holds the information about a single person. The Party class 505 captures the fundamental information common to both. The generalised Party class also allows associations to other classes to be more easily portrayed and understood.

A party 505 is defined as either an individual 815 or an organisation 800. Any one instance of Party 505 is a single instance of an Organisation 800 or an Individual 815. Party allows for a general reference to both Organisation 800 and Individual 815. An organisation 800 consists of one or more organisation roles 905. For each organisation role 905, there may be a party 505 assigned to fulfil that role. Whenever this is the case, the nature of the relationship between the party and the organisation role 905 is defined as an organisation assignment 910.

The notion of a group is captured in the model by the Organisation class 800. An Organisation 800 can be one of many types. Some of these types require the model to capture knowledge of unique characteristics for that type. Typical organisation types and sub-types would be:

| Organisation Type | Potential Sub-types |
| --- | --- |
| Organisation | Internal unit |
| Statutory Organisation | Government, Association, Enterprise |
| Household | |
| Government | Agency. Military Branch |
| Enterprise | Non-Profit, Proprietorship, Corporation |

The use of structures such as this to model the complexities of organisations and their constructions allows the management of organisation data to be made more efficient. Organisations tend to describe themselves in terms of sub-organisations and positions which individuals take on. For example, an organisation may have a Chief Executive Officer, Chief Technology Officer, Chairman, etc. The structure shown in FIG. 9 allows these roles to be defined, independently from the individuals who may be assigned to them. It also allows individuals to take on one or more roles (even within one organisation 800) and it allows the nature of the assignment 910 (e.g. for a given period of time) to be defined as part of the organisational make-up.

Without this powerful construction, data management systems would be required to un-build and re-build data associated with each individual and how they fit into an organisation, every time there is an organisation change. This construction prevents the need for this and enables efficient data management practice to be put into place.

Figure 12:
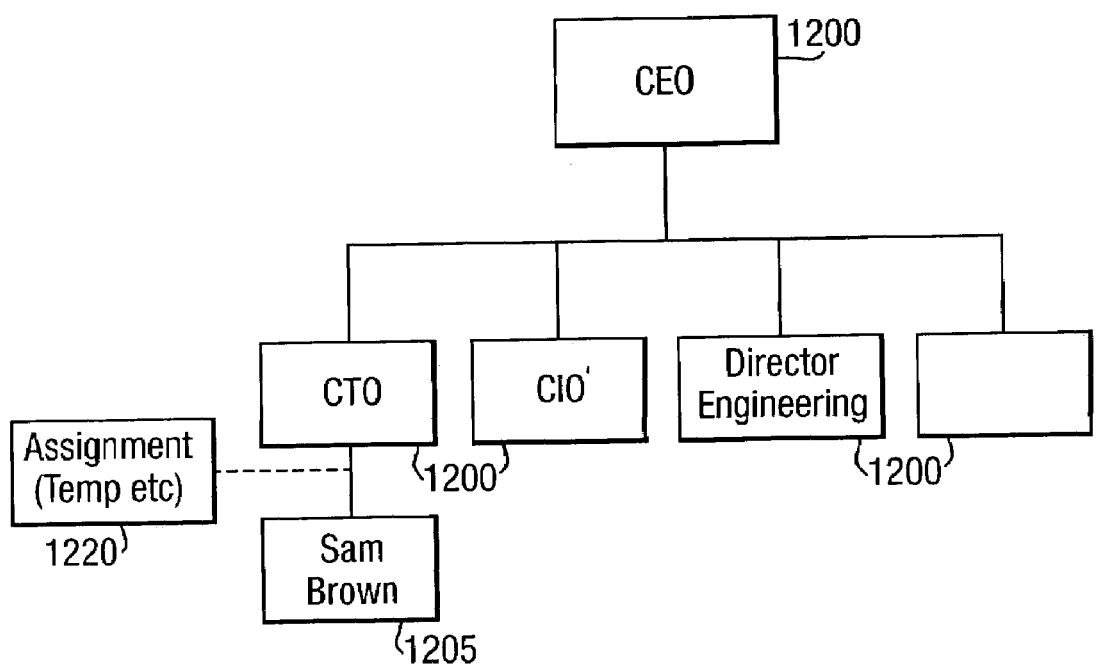
FIG. 12 shows an organisation chart that could be processed according to the model to show the benefit of role assignment.

Referring to FIGS. 8, 9 and 12, as an example of the role assignment class in use, an organisation such as British Telecommunications might have an organisational chart that sets out a hierarchy of specified roles 1200, some of which have been assigned to individuals 1205. At least one of these assignments has an associated description 1220 of factors in the role assignment such as term, and time to be allotted over each working year. For instance, the CTO (Chief Technology Officer) is an object of the class Organisation Role 905. In FIG. 12, this role has been allocated to the individual Sam Brown 1205, represented in the information model as an object of the class Party 505, in this case an object of the class Individual 815. The nature of the assignment, given by the associated description 1220 of factors, is represented by an object of the class Organisation RoleAssignment 905/910.

If the individual allocated the role of CTO changes, then a new object of the class Party 505 will be substituted and it may not be necessary to make other changes. However, the Organisation RoleAssignment 905/910 can be independently changed. For instance, Sam Brown may have accepted a change from a temporary to a permanent post in the role CTO. This will appear in a model of the organisation as a change in the Organisation RoleAssignment 905/910 but it is not necessary to make any changes in the Party object for Sam Brown which could be a complicated exercise.

Figure 10:
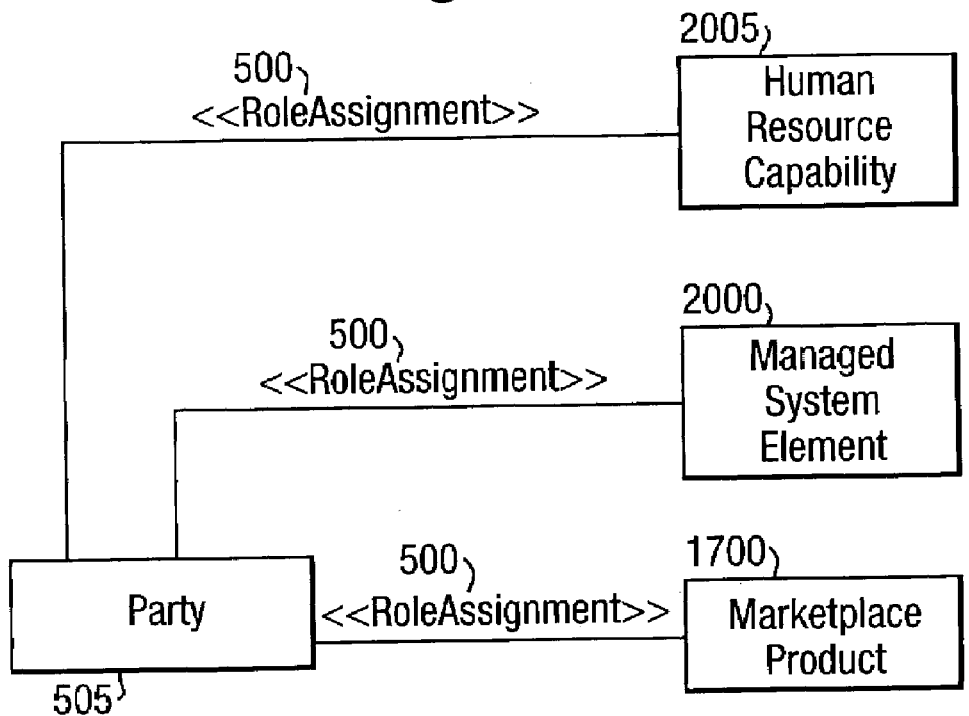
FIG. 10 shows a class diagram for the party concept in relation to organisations and individuals.

FIG. 10 shows the complexity which can be involved in numerous associations to Party 505, via the <<RoleAssignment>> stereotype 500. If these associations were to be with Individual 815 and Organisation 800 separately, the model would soon be unreadable. The Party 505 could even facilitate implementing the regulations of the European Data Protection Act by acting as the focal point for data concerning the Organisation 800 and Individual 815.

Figure 11:
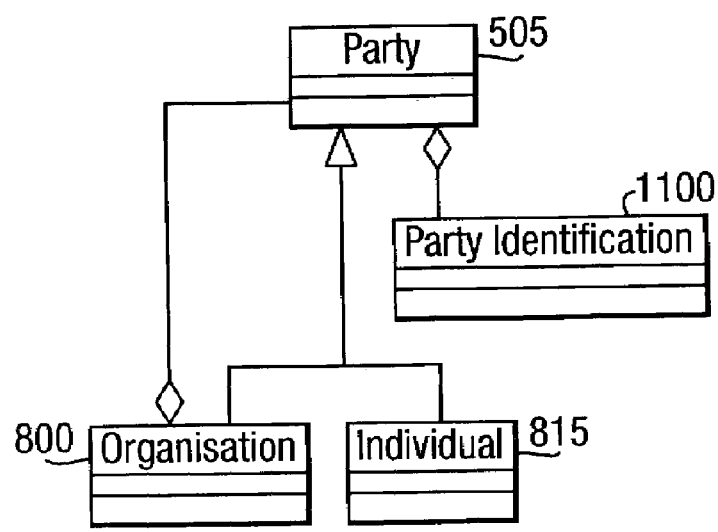
FIG. 11 a class diagram similar to FIG. 10 but introducing party identification.

Referring to FIG. 11, a Party 505 represents an Individual 815 or Organisation 800 which has a relationship with the business. There are many ways of identifying a Party, some unique, e.g. Driver's License number, National insurance Number, and some non-unique, e.g. name. In addition, there are the credentials that a party must have to be able to engage in commerce, such as tax ID, DUNS Number, SIC Code, Tax Exemption. The model represents all these attributes through the Party Identification class 1100.

Agreement Concept

In the course of daily commerce, a Party may wish to strike accords with other Parties. These accords are modelled as Agreements. The core Agreement classes are shown in FIG. 14.

Figure 14:
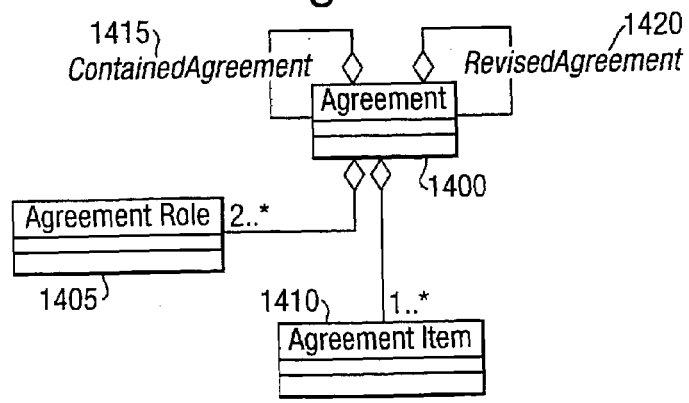
FIG. 14 shows core agreement classes.

Referring to FIG. 14, the structural definition of an agreement involves three classes: Agreement 1400, Agreement Role 1405, and Agreement Item 1410. The Agreement class 1400 serves as the centre point for the information about an agreement. It contains descriptive data and the "when" information (start date, end date). The Agreement Role class 1405 captures the functional positions outlined by an Agreement. The model requires at least two Agreement Roles be defined for an Agreement. These roles would be the principals for which the agreement exists. The Agreement Item class 1410 represents the "what" of an agreement. The model requires at least one Agreement Item be in existence for each Agreement.

There are two aggregations of Agreement to the Agreement class 1400 in the model. The one labeled "ContainedAgreement" 1415 allows for the notion of "master agreement/sub-agreements" to be supported. The one labeled "RevisedAgreement" 1420 represents the linking of revisions of an Agreement back to its predecessors and the original.

Figure 15:
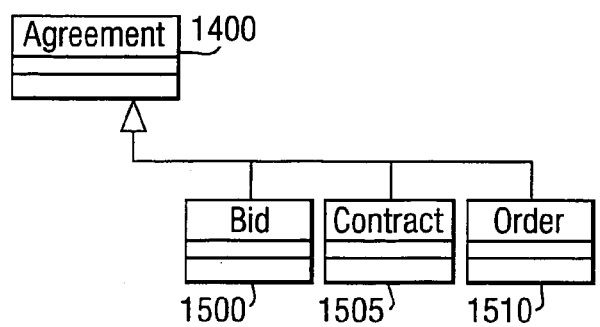
FIG. 15 shows possible sub-classes of the agreement class.

Referring to FIG. 15, an Agreement 1400 can be one of many types. Some of these types possess unique characteristics that a model must capture in use. The model records this uniqueness by sub-classing Agreement into Bid 1500, Contract 1505, and Order 1510 classes. As more Agreement types are needed, the model can be extended via sub-classing.

Agreement Assignment

Figure 16:
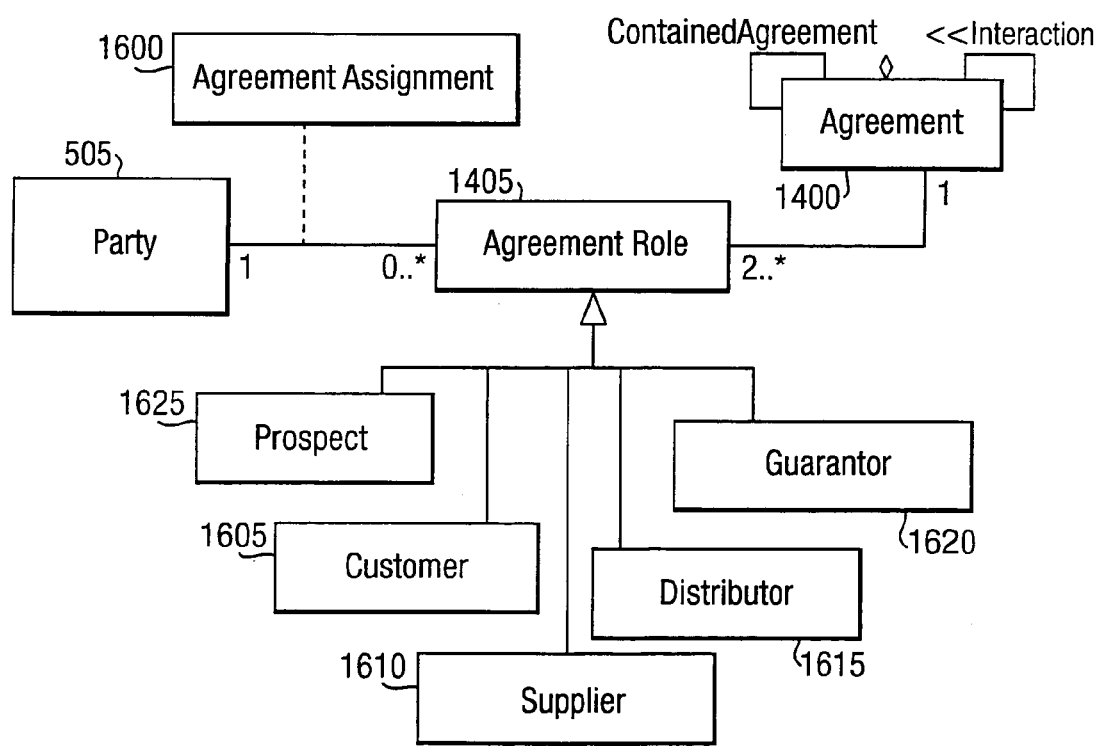
FIG. 16 shows association of parties to agreements.

Referring to FIG. 16, when two Parties 505 enter into an Agreement 1400, it is in reality an accord between the two Parties to play certain roles within a relationship concerned with exchanging service or goods. The link between Party 505 and Agreement Role 1400 captures the role that the Party is playing within a specific Agreement 1400.

An Agreement Role 1400 can be one of many functional positions, some of which are enumerated by sub-classing Agreement Role into Customer 1605, Supplier 1610, Distributor 1615, Guarantor 1620 and Prospect 1625 classes as shown. As new Agreement Role types are needed, the model can be extended via sub-classing. The Agreement Roles required are determined by the Agreement and may be different for each Agreement.

The Agreement Role 1405 defines what the functional positions are within the Agreement, while the Agreement Assignment 1600 defines who is assigned that position. The Agreement Assignment class 1600 captures the timeframe and status of a Party 505 playing a specific Agreement Role 1405. For each Agreement Role 1405 in which a Party 505 is involved, there will be an Agreement Assignment object 1600 created.

For example, an Agreement may specify that there is to be a customer contact. For the first three months, Gerard Wiekens was the customer contact. Since then, Andy Morrison has been the contact.

The Agreement 1400 has an Agreement Role 1405 defined for "customer contact."

The Party 505, Gerard Wiekens, has an association with Agreement Role "customer contact" recorded as an Agreement Assignment 1600 for Gerard with the status of "active".

In three months, the Party 505, Andy Morrison, takes over the job. An association with Agreement Role "customer contact" is recorded as an Agreement Assignment 1600 for Andy with the status of active.

The Agreement Assignment 1600 for Gerard, associated with the Agreement Role 1405 of "customer contact", has its status marked "inactive".

Agreement Item

Figure 17:
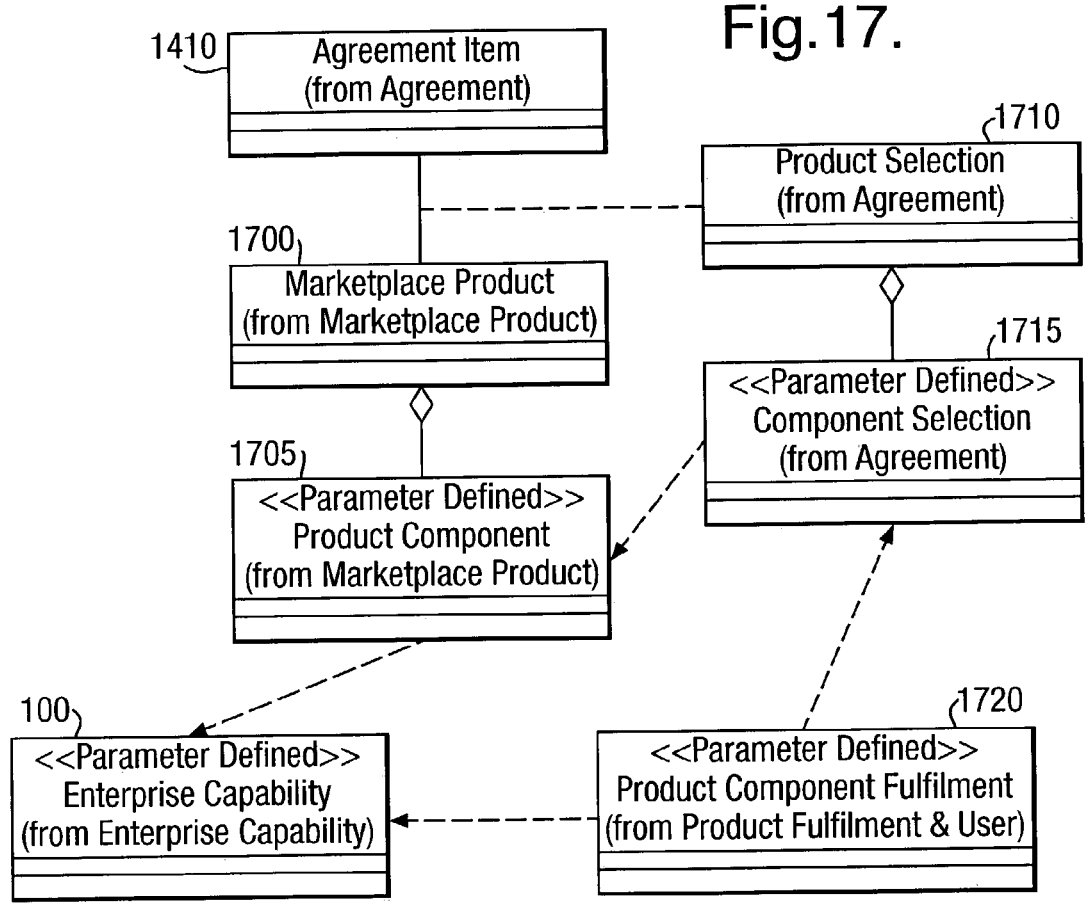
FIG. 17 shows the construction and selection of marketplace products, in particular in relation to product component fulfillment and enterprise capability.

Referring to FIG. 17, the Agreement Item class 1410 represents a line item within an Agreement 1400. An Agreement must have at least one Agreement Item. Each Agreement Item 1410 specifies a Marketplace Product (MPP) 1700 to be purchased/provided and the quantity of that MPP. An Agreement Item 1410 may only be associated with one specific Marketplace Product 1700, but it may indicate 1-to-many instances of that Marketplace Product's components.

Marketplace products (MPPs) 1700 are offered to the marketplace in response to a market demand. A supplier undertakes to provide an MPP 1700 to a customer as a result of some contractual agreement. In so doing, the MPP 1700 is bound to the agreement as an agreement item 1410. The MPP will be made up of one or more product components 1705. When the customer specifies the MPP in the agreement 1400 he/she will make a product selection which will consist of one or more component selections, as determined by the choices the customer makes. The component selection 1715 must be dependent on the product component 1705 to which it refers. That is, it should not be possible for a customer to choose a component that is not on offer as part of that MPP 1700.

The following two examples illustrate the Agreement concept discussed to this point:

1. Mark Kennedy has sold a computer, on behalf of his employer, IBM, to Kevin Horlock:

The Agreement is an accord for exchanging money for goods.

The computer (one of the MPPs 1700 which IBM offers) would be referred in the Agreement Item 1410.

The specifications of the computer (RAM, disk size, etc) are captured in the Component Selection 1715 and aggregated into Product Selection 1710.

Kevin Horlock is a Party/Individual 505/815 with the Agreement Assignment 1600 of Customer.

IBM is a Party/Organisation 505/800 with the Agreement Assignment 1600 of Supplier.

Mark Kennedy is a Party/Individual with the Agreement Assignment of "Salesperson."

2. A head of household enters into an Agreement 1400, in order to obtain Email service for a child:
   The Agreement is an accord for exchanging money for the Email service.
   The Email service would be represented as a Marketplace Product 1700 in the Agreement Item 1410.
   Each separate specification for the Email service is captured by Component Selection 1715 and these in turn are aggregated to a Product Selection 1710 of 'Email Service'.
   The parent is a Party/Individual 505/815 with the Agreement Assignment 1600 of Customer 1605.
   The service provider is a Party/Organisation 505/800 with the Agreement Assignment 1600 of Supplier 1610.
   The child is a Party/Individual 505/815 with the Agreement Assignment 1600 of 'Grantee'.

The Marketplace Product 1700 and its related classes allow the enterprise to create products for the marketplace in terms of the Product Component 1705. The Product Component 1705 represents a cohesive unit of deliverable product that has business and/or technical meaning, such as email service and address book. The Product Component class 1705 is a "Parameter Defined" class which may also have an <<Interaction>> relationship, of one component to another. Components are configured into a Marketplace Product 1700 in allowable combinations where the Product Component Interaction allows dependencies, one component to another. The parameters used to define Product Component 1705 represent characteristics that define the component to the marketplace and technical requirements to be supported by the enterprise. Such parameters may state "1 email administrator required" or "1 gateway server required". Additionally, the parameters can express product configuration choices, such as "e-mailbox size: 50M or 60M"

In time, the supplier will fulfil each component selection 1715 as a product component fulfilment (PCF) 1720. The PCF defines what the customer actual receives. The PCF 1720 will be dependent upon the component selection 1715. That is, it should not be possible for the customer to receive a PCF that is not based upon a chosen component selection 1715. For the supplier enterprise to fulfil the selection it must have the enterprise capability to deliver. Each PCF 1720 will be dependent upon existing or planned enterprise capability 110. Furthermore, the product components 1705 offered to the marketplace will also be dependent on existing or planned enterprise capability 110.

The use of this construction has a number of benefits to an enterprise seeking to manage the data relating to commerce with its trading partners:
   It ensures that there is an audit trail between offers to the marketplace, the trading agreement, the customer's selection, the fulfilled order, and the ability of the supplying enterprise to deliver.
   It allows a modular approach to product construction, making for efficient re-use of enterprise resources.
   It allows an enterprise to offer products to the marketplace but bring to bear changing capabilities in how it delivers to its customers. This allows for technology swap-out without impact on customer service.
   It allows the separation of data relating to the offer, the request and the fulfilment. This enables an enterprise to provide substitutes (subject to customer agreement) where efficient operation dictates, while maintaining the data for the original request.

Referring to FIG. 17, there is a dependency relationship between Enterprise Capability 110 and Product Component 1705. This represents the constraints the Enterprise Capability parameters must have on the Product Component parameters. This is to ensure that products are not defined for which there are no present or planned capabilities. In an example, a Product Component parameter cannot state "number of address book entries: 500 or 1000 or 1500" if the corresponding Enterprise Capability parameter states "number of address book entries must be less than 1000".

The Marketplace Product 1700 uses the Product Component 1705 to give flexibility to the creation of offers to the marketplace. For example, if Microsoft Word™, Excel™, Access™, and PowerPoint™ are Product Components, then a Marketplace Product of "MS Office™" may be created. In addition, all of these may be offered individually as Marketplace Products 1700. To further combine these with consulting or education classes, a Product Component 1705 for consulting and one for education may be created. These can now be combined with the Product Components to form new Marketplace Products 1700 that include the service (consulting/education) and product ("Office").

Figure 18:
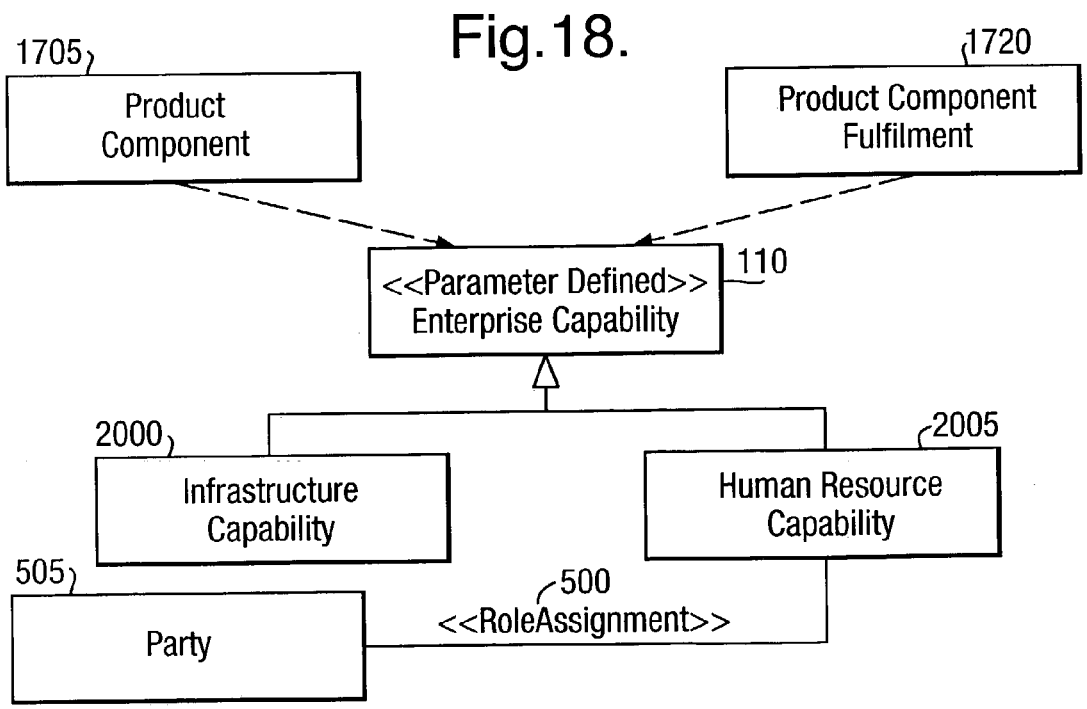
FIG. 18 shows classes comprising the enterprise capability concept.

Referring to FIG. 18, The Enterprise Capability concept represents the ability of an enterprise to offer products and services based upon its abilities (Enterprise Capability class 110) and the activities that ensure that the capabilities are suitably configured. The classes that comprise the Enterprise Capability concept are shown in FIG. 18.

An enterprise's Marketplace Products 1700 are built upon the capabilities available to the enterprise. These capabilities must have staff and technical prowess to deliver them once a Marketplace Product is sold. In FIG. 18, the Enterprise Capability represents the range of all the product-forming and product-impacting capabilities of the enterprise. It is categorized into two general groups:

Infrastructure Capability 2000—represents all of the abilities provided by the technical infrastructure, such telephony, IP services, routers, telephones, buildings, etc.

Human Resource Capability 2005—represents expertise and operational support that people offer the customer on behalf of the enterprise, sometimes direct and sometimes through an outsourcing arrangement. Operational support might include such activities as customer care and network management, e.g. hot-line support, operator services, network support for a customer. Other such areas of expertise might include sales support, education & training, undertaking activities such as: IP application consulting, product education and training, business improvement consulting etc.

The Enterprise Capability 110 is shown as a "Parameter Defined" class. This means that the class has associated with it any number of parameters that are used to capture the aspects and constraints of the capabilities. Such a parameter may state for example that "email mailbox size must be less than 1 gigabyte" or that "number of address book entries must be less than 1000". The parameters are used to express the boundaries of characteristics for potential product.

Product Component Fulfilment

Referring to FIG. 17, the Product Component Fulfilment (PCF) 1720 is a "Parameter Defined" class that represents a specialisation of an Enterprise Capability 110, bound by the parameter choices made from the corresponding Component Selection 1715 when the Agreement is determined and a Product Selection 1710 is made.

The Enterprise Capability 110 defines what the enterprise can provide, and when, and the Product Component 1705 represents what is offered to the marketplace via the Marketplace Product 1700. The Product Selection 1710 represents what is chosen in the Agreement (as a collection of Component Selections 1715) and the Product Component Fulfilment 1720 is what is actually provided.

This is best served by example.

Danny Granville visits the BT shop in order to buy a new answering machine. BT has several models on show and others in a product catalogue. Danny has £100 to spend and chooses a top-of-the-range digital model with remote interrogation facility. The shop doesn't have this particular model in stock, but agrees to fulfil Danny's order within two weeks. One week later, Danny gets a Jiffy bag in the post in which is his new answering machine.

In the above example, BT's catalogues contain all the Marketplace Products 1700 that BT is making available to the public. Each answering machine type in the catalogue is a Marketplace Product 1700. Each type of answering machine consists of the basic machine and other features (such as digital recording or remote interrogation), each of which are Product Components 1705. The features that can be Product Components are dependent on the Enterprise Capabilities 110 that BT can command. Danny's selection of a specific answering machine type is the Product Selection 1710. The individual choices for component options within that selection are the Component Selections 1715. The Product Component Fulfilments 1720 are the collection of things which arrived for Danny in the post. These include the basic answering machine, the digital recording facility and the remote interrogation facility. Note that Product Component Fulfilment 1720 is a Parameter-defined Class, which in this case will indicate the relationship between the three Product Component Fulfilments 1720 that were in the Jiffy bag.

Another example:

Terry Cooke wants to receive cable service. The cable provider, Acme Cable, is able to supply basic cable, a multitude of film channels, and the Aquarium channel, which broadcasts the goings on within a tropical fish tank 24 hours a day. Acme has a special deal where the subscription for basic cable is bundled with the Aquarium channel for a mere $30 per month. Terry loves to watch fish so he signs an Agreement with Acme Cable for this special deal. Acme Cable activates the cable line in Terry's home, which automatically gives him TV access to the basic channels, and starts sending a feed for the Aquarium channel. Now, Terry can watch fish all day long from the privacy of his own home.

In this example, the Enterprise Capability is the cable network infrastructure and all the entertainment channels that Acme Cable can provide. The Marketplace Product is the "special deal" which consists of a Product Component called "basic cable" and a separate Product Component called "Aquarium channel feed", to which a Pricing Policy is attached of $30/month. It should be noted that there is a dependency between the Product Components 1705 here; one cannot receive the Aquarium channel unless one also receives basic cable. The Product Selection 1710 is the request for the "special deal" by Terry, within the Agreement with Acme Cable. Note: he makes two Component Selections 1715 as part of this overall Product Selection 1710. Terry then receives two Product Component Fulfilments 1720, one for the basic cable feed to Terry's house and one for the additional Aquarium channel feed.

In the above example, the Aquarium channel must be treated as a separate Product Component/Product Component Fulfilment, since if Terry decided he no longer wants to pay for this channel, it can be cancelled without disrupting the basic cable feed. Thus, a Product Component Fulfilment 1720 is the realisation of what each Product Component 1705 represents within the context of a purchased Marketplace Product 1700.

Importantly, there is here a structure of dependency which can both prevent an organisation from failing to deliver correct goods and from failing to record what goods were delivered. That is, Product Component Fulfilment 1720 is dependent on Component Selection 1715 and Enterprise Capability 110. In known data management systems, it is possible for an enterprise to deliver a product to a user which is different from the original request, for instance because they only had an alternative in stock. The order record however may easily be marked off as dealt with. However, the alternative product may not meet the user's requirements and the delivery of a substitute may never be recorded in stock records. If the customer complains, the complaint could even be logged against the original order record, relating to the original product requested, and thus distort marketing data because the complaint should actually have been logged against the substitute. Importantly, subsequent support to the customer can be based on the wrong premise. An engineer may go wrongly equipped to the customer premises because the record for that customer shows the wrong product description.

In embodiments of the present invention, it is not possible to enter a record against product component fulfilment for a product that was not available or not requested. This is a direct consequence of the dependency of the Product Component Fulfilment 1720 class on Component Selection 1715 and Enterprise Capability.

In embodiment of the present invention, not only is the Product Component Fulfilment 1720 dependent on a current Enterprise Capability 110 but it can be made dependent on a planned Enterprise Capability. The class definitions are listed below. It can be seen that the Enterprise Capability 110 contains data for "Effective Date" and "Termination Date" while the Product Component Fulfilment 1720 contains date for "Availability Date". Thus an instance of the Product Component Fulfilment 1720 can be given an availability date which will either be immediate or will be at a date in the future determined by the "Effective Date" of the Enterprise Capability supporting the Product Component Fulfilment 1720 instance. If the current date is already past the relevant "Termination Date", the Product Component Fulfilment instance will show it to be unavailable. For instance the status might show "suspended".

Dependency in this context means that it is not possible to instantiate an instance of a dependent class before there is a instantiated instance of a class from which it is dependent. In database terms, it is not possible to create a record in a table until reference has been made to another table for a record which matches the dependency. An example of the effect this has in the user world is that of a user trying to initiate a user session. Unless an Access & usage Rights Policy exists, which is met, the user is barred from initiating the user session (see below the description with reference to FIG. 19).

In the context of product fulfilment, the class dependencies described above mean that the following series of steps takes place:

i) A supplier decides to launch a new product on the market. To do that, it is first necessary to instantiate in the data management system an enterprise capability object 110 which may have an effective date in the past, present or future (thus accommodating planned infrastructure as well as existing infrastructure). This first necessary step is subsequently used by the data management system to ensure the new product can be supported as of launch.

ii) Before launch, it is necessary to instantiate a marketplace product object 1700 in the data management system. Because of the class dependency, this is not accepted by the system until it has located an existing enterprise capability object which satisfies the marketplace product object prior to instantiation. If there is such an enterprise capability object, the system accepts the marketplace product object 1700 and the supplier can now launch the product on the market. An example might be Internet Services.

iii) A customer decides to buy the product. The customer and the supplier come to an agreement about terms, such as price and start date, and an instantiated agreement object 100 is entered to the system.

iv) The marketplace product object 1700 will have generated a set of dependent product components 1705 which represent choices for the customer. For instance the Internet Services product may contain the components WWW access, UseNet access and SMTP access. A product component 1705 will identify one of these components, say WWW access, plus a set of options within that component, such as whether access is available via all sites or via a selection and whether access is available all day or between certain hours. In making an agreement, the customer makes not just a product selection 1710 but also a component selection 1715. For instance the customer may choose the product "WWW access" with the components that it will be available at a subset of sites and for the hours 6pm to 8am only. In the data management system, this component selection 1715 is dependent on the product components 1705 and can only thus be instantiated if the system can locate a relevant product component 1705. The customer's product selection 1710 includes an aggregation of the component selections 1715 for the product.

v) The supplier will now want to deliver the customer's choice. To record delivery on the system, it is necessary to instantiate a product component fulfilment object 1720. This has dependency on both the customer's component selection 1715 and the enterprise capability 110. Hence, it is not possible to record delivery of a product to the customer which wasn't related to the customer's component selection 1715 or cannot be supported by the enterprise.

A strength of the system described above is that there are at least two checks made on enterprise capability. Support for products/services is a perennial problem for communication companies. In embodiments of the present invention, a first check is enforced when a marketplace product is launched. Although the enterprise capability doesn't have to be there at day one, as long as there is planned capability, the product can still be launched as long as the launch date instantiated in the marketplace product object 1700 is supported by the effective date in the enterprise capability object 110. Importantly, a second check is enforced at a time when the scenario may be very different, that is, after a customer has responded to a product launch and the supplier is ready to deliver a product to the customer. This may be some time after the product was first launched and the enterprise capability may have changed significantly. For instance, the termination date instantiated in a relevant enterprise capability object may have passed. If this is the case, it is not possible to enter to the system an unsupported product component fulfilment object 1720.

It is preferable that the product selection 1710 is dependent on the relationship between the agreement with a customer and a product. That is, an agreement which refers to a product.

It may be that a supplier is unable to deliver a product originally selected by the customer and intends to enter a product component fulfilment object 1720 which fails in its dependency on the component selection 1715. This will be acceptable as long as an instantiated agreement item 1410 could be satisfied by the substitute. To allow the system to deal with this, two instances of the product component fulfilment object 1720 which point to each other need to be entered in the system.

It can be important that there is an accurate entry in respect of product component fulfilment 1720. For instance, it may be that a customer wants a frame relay product. It may be found that the customer has no sites supported by frame relay but has sites supported by SMDS. Although an instantiated agreement 100 for the customer may show that the substitution is acceptable, it is very important that an engineer providing support is able to know that he is dealing with SMDS and can have the correct equipment for a site visit. It is important that the system can make two references, one to the component selection 1715 (what the customer ordered) and one to the product component fulfilment 1710 (what was delivered).

The enterprise capability in the above description will comprise a series of managed system elements and defined capacity. The arrows in FIG. 17 from the Product Component 1705 and the Product Component Fulfilment 1720 are references to the managed system elements. In an example of this in practice, a Marketplace Product 1700 might be PSTN (Public Switched Telephone Network) services. The supplier may have installed 10,000 switches. At product launch, the product components 1705 will point to all of the switches. However, a customer may need the service at a single switch, for instance the Ipswich switch. Hence the Product Component Fulfilment 1720 for this customer's order will be dependent on the Ipswich switch.

The presence of this dependency on the managed system elements allows the supplier to make decisions about where to launch new services (ie products). For instance, the ADSL product will need to be supported by ADSL switches. A database of switches is available to or contained in the enterprise capability 110. In the UK at present, the ADSL product component 1705 will point to about 30% of those switches and the product component fulfilment for a customer will probably point to just one of those switches. This prevents the supplier reaching agreement to supply the ADSL product to a customer who simply cannot be supplied with it.

If there is no longer support for a product component, it will simply lose its reference and fail in its dependency. If in the example above, all the ADSL switches are closed down, the ADSL product components 1705 will no longer be valid. This is standard database practice that once the last reference goes, it's flagged to the system that integrity has been lost and the relevant product component will be deleted.

An advantage of embodiments of the present invention is that kit can be changed without changing product definitions. For instance, if there had been 300 ADSL switches available, recorded in the enterprise capability 110, and 100 are closed, the product components 1705 dependent on ADSL switches remain unchanged. The only thing that will change is that the 300 references in the system which were previously between each ADSL product component 1705 and the switches recorded in the enterprise capability 110 will drop to 200 references.

Dependencies of the type described above will take different forms in different database technologies. In database jargon, they will often be referred to as "foreign keys". Dependency as described is a particular form where one object can't exist without another existing first.

User vs. Customer

It is common practice in "real life" for the Customer and User of a service to be different entities. For example, a company might be identified as a Customer in an Agreement for a PC Helpdesk service but clearly it will be the individual employees that actually make use of the Helpdesk. Embodiments of the present invention therefore explicitly separate Customer from User in the model. A Customer is an Agreement Role within an Agreement that is associated with a specific Party. A User is an entity that actually interacts with the Product Component Fulfilment.

In the answering machine example above, Danny Granville is both the Customer and User. As a Customer he enters into an Agreement with BT for the purchase and provision of his chosen machine. He receives the Product Component Fulfilments in the mail and may interact with them as a User. For example, he may set-up the time on the answering machine, may record an out-going message with the digital recording facility and may interrogate the device remotely at some later time to pick up his messages. However, Danny in the Agreement Role of Customer could have requested that the machine be sent to his cousin Mortimer. In this case, Danny is the Customer and Mortimer will be the User, since Mortimer will now have the interaction with the device that he receives in the mail. Note that in this example, Danny is granting rights to Mortimer to use the answering machine.

Types of User

A User need not always be a person. The User may also be an organisation or a device, depending on nature of the Product Component Fulfilment. For example a CRON job (a Programme that is scheduled to run at regular times) that is collecting information from a database overnight would be the User of the database.

These different types of User are represented by the sub-classes Human, Non-Human and User Group. A Human User is associated with a Party, of sub-type Individual, but an Individual may be associated with one or more Human Users. A Non-Human User is associated with one Managed System Element, but an MSE may be associated with one or more Non-Human Users.

A User Group is a set of one or more Users, that have a common set of Credentials, interact with the exact same PCF and are administered as a single User. A User Group may consist of any combination of Human Users, Non-Human Users and User Groups.

Credentials and Access & Usage Rights Policy

Figure 19:
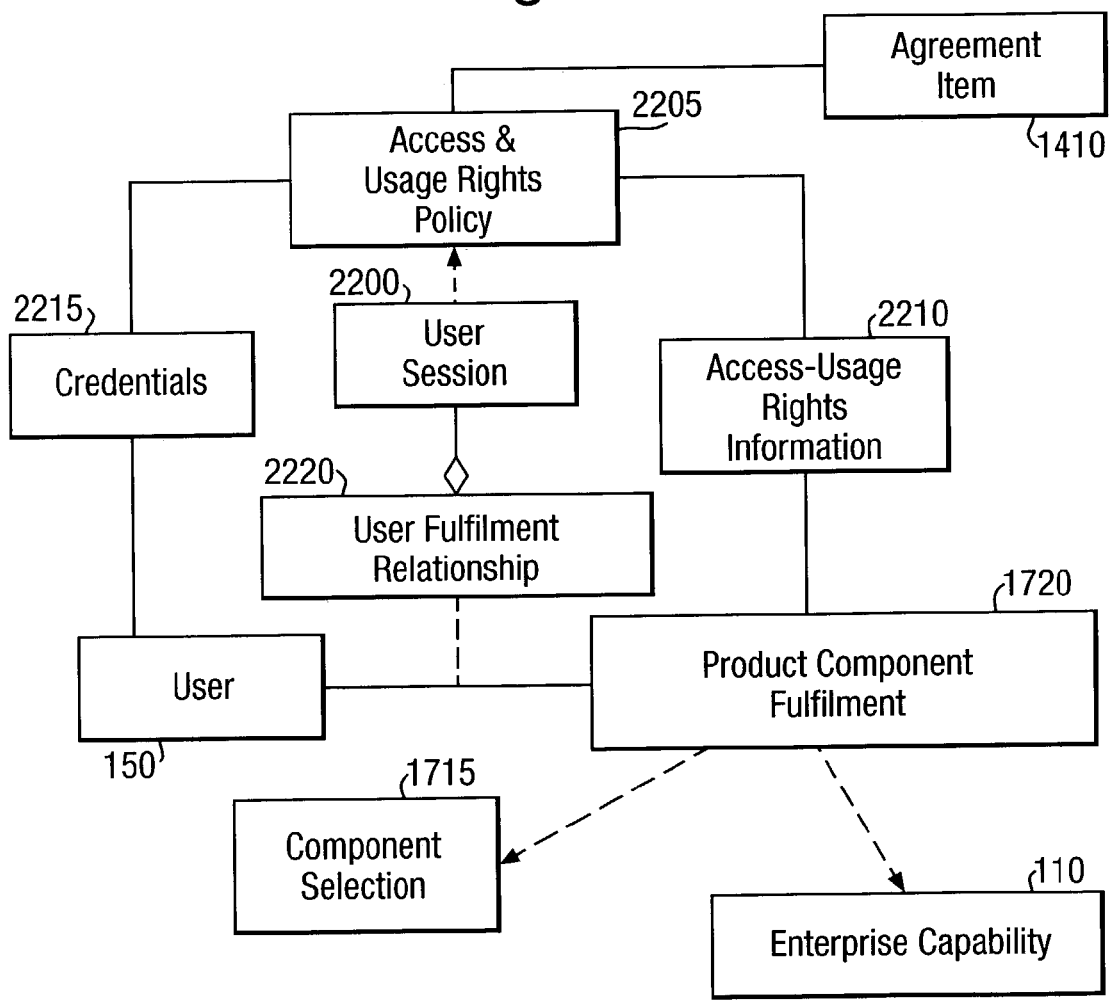
FIG. 19 shows the construction of the relationship between the user, product component fulfillment and the agreement.

User/Customer Separation and the Relationship of a User with a Service Fulfilment Referring to FIG. 19, when a customer enters into an agreement with a supplier, the fulfilled product component 1720 (see above) may be presented to a number of users 150. FIG. 19 shows the construction of the way in which users are related to the product component fulfilment (PCF) and the original customer/supplier agreement.

Each user 150 is granted rights to use the product component fulfilment 1720, as determined in the agreement between customer and supplier which resulted in the selected product component 1705 being fulfilled (see above). When the user uses the PCF 1720, a user-fulfilment relationship (UFR) 2220 is formed, consisting of the data for each user session 2200. The ability to create a user session is determined by the access and usage rights policy (A&URP) 2210 in force for that UFR 2220. Each agreement between customer and supplier will contain one or more agreement items 1410, which may refer to an A&URP 2210. The A&URP 2210 determines the way in which the user interacts with the PCF 1720, as set out by the customer. The A&URP 2205 assesses the credentials of the user and the access-usage rights information 2210 of the PCF 1720, to determine the policy for access and usage.

The use of this construction has a number of benefits to an enterprise seeking to manage the data relating to customers, users and use of the fulfilled product components:

It allows data associated with the customer to be kept separate from that of the user. In examples of supplying communication services to large business there may be many users but only one customer. For efficient business management, it is essential to separate their concerns. For efficient data management, it is essential to manage user data (which tends to be concerned more with service elements and is transitory in nature) from customer data (which tends to be concerned more with commercial elements and is more long-lived).

While providing for separated customer and user concerns, it allows the use of flexible business rules (via a policy class) to ensure that users rights are governed by the contractual agreement binding on the customer.

It allows for separate data management of the user from its credentials. In fast-moving communication services, the credentials may need to be managed in real time to determine access rights on the fly.

It allows for separate data management of the PCF from the elements of service which need to be assessed by the rights policy. This allows for changes in operational capacity to be reflected in the rights granted to users, without affecting the overall service specification. This is essential in services that share common resources and where demand fluctuates over time.

The above is now discussed in more detail. In embodiments of the present invention, the commonly used terms of authentication and authorisation are modeled as the validation of a User's Credentials 2215 and the evaluation of business rules associated with the access and privileges pertaining to a User's interaction with a Product Component Fulfilment 1720.

There are many different schemes that can be used to determine the rights of a User 150 to make use of a Product Component Fulfilment 1720. These schemes may be based on who the User is, what role the User is playing, what tokens the User possesses, or some combination of these and other schemes. The security mechanism implemented is determined by the type of scheme and the level of security required. For example, username/password or digital certificates can both be used to enforce a scheme based on User identity but one provides a greater level of security than the other. The variety of options means that the model cannot prescribe the use of, or make assumptions about the type of scheme or choice of mechanism that will be used in any particular situation. To model this in a generic manner the following classes can be defined: Access & Usage Rights Policy 2205, Credentials 2215 and Access-Usage Rights Information 2210.

Access & Usage Rights Policy 2205

The Access & Usage Rights Policy is the set of business rules that determine the rights of a User 150 to use a Product Component Fulfilment 1720. This policy is established as a result of an Agreement. For example, a Customer has selected a 2 Mb Virtual Private Network, which supports up to 10 users. Of these 10 users, 2 will be enabled at the full 2 Mb and the other 8 will be enabled at 0.5 Mb. The set of valid user profiles and their bandwidth allocation will form part of the Policy Rules of the Access & Usage Rights Policy 2205. In addition to this information it is likely that a username/password system will be used in the validation of the Credentials 2215. A complete entry in the Access & Usage Rights Policy might then be "IF login=Joe Mercer AND password=Happy THEN allow access at 2 Mb". The Access & Usage Rights Policy must be evaluated to allow the User 150 to access and use the Product Component Fulfilment 1720.

The Access & Usage Rights Policy 2205 can be modified during the lifetime of the Agreement 100. This might be as a result of a revision to the Agreement 100 but could also be modified by the Users 150 themselves. An example of modifying Access & Usage Rights Policy is the head of a household who is able to set the rights of the children to access channels on a Video-On-Demand service. Within the Access & Usage Rights Policy 2205, there would be a Condition that grants the right to access a Product Component Fulfilment of a Policy Administration Product Component 1705, to a User 150 with the proper Credentials 2215. Access to this PCF 1720 would give the User the ability to change certain Conditions within the A & UR Policy 2205 governing the Video On Demand service for other Users 150 within a specified grouping.

Credentials 2215

The Credentials 2215 of a User 150 represents all information about the User 150 that is required by the Access & Usage Rights Policy 2205. The information held depends on the type of rights determination scheme and authorization/authentication mechanisms employed. In the VPN example, the User is identified via its account and password. The Credentials 2215 of the User 150 would therefore comprise the username and the password of the User.

Access & Usage Rights Information

The Access & Usage Rights Information 2210 holds all information relating to the Product Component Fulfilment 1720 that is required by the Access & Usage Rights Policy 2205. For example, an additional condition in the Access & Usage Rights Policy 2205 might be that a User 150 cannot connect to the VPN if the total bandwidth being utilized by the current Users is 90% of the agreed 2 Mb. The information about the total utilization would be held in the Access Rights Information 2210.

User-Fulfilment Relationship 2220 and User Session 2200

The User-Fulfilment Relationship (UFR) defines the association between a User 150 and a Product Component Fulfilment 1720. Minimally, the UFR 2220 describes the length of time that this association exists. The UFR contains one or more User Sessions 2200, defining specific instances when the User-Fulfilment Relationship 2220 is in use. Each User Session 2200 may generate Events 115, which may be interpreted as Usage by the Event Policy (see class descriptions).

For example, Shaun moves into a new apartment and enters into an Agreement 100 with the telephone company to activate the apartment's phone line. In this example, the Product Component Fulfilment 1720 is the activation of the phone line. The User 150 is the termination point of the phone line, an MSE, located in Shaun's apartment. The User-Fulfilment Relationship 2220 exists as long as Shaun pays the bills or doesn't request that the line be de-activated.

A User Session object 2200, associated with the UFR 2220, is created every time the phone goes off-hook and a phone number is entered. So, if Shaun picks up the phone and calls his mother, a User Session object 2200 is created.

Implementation Aspects

One option for implementation of a system according to an embodiment of the present invention is to implement an information repository which provides a set of information management services to the enterprise. This implementation is discussed in the following.

Figure 20:
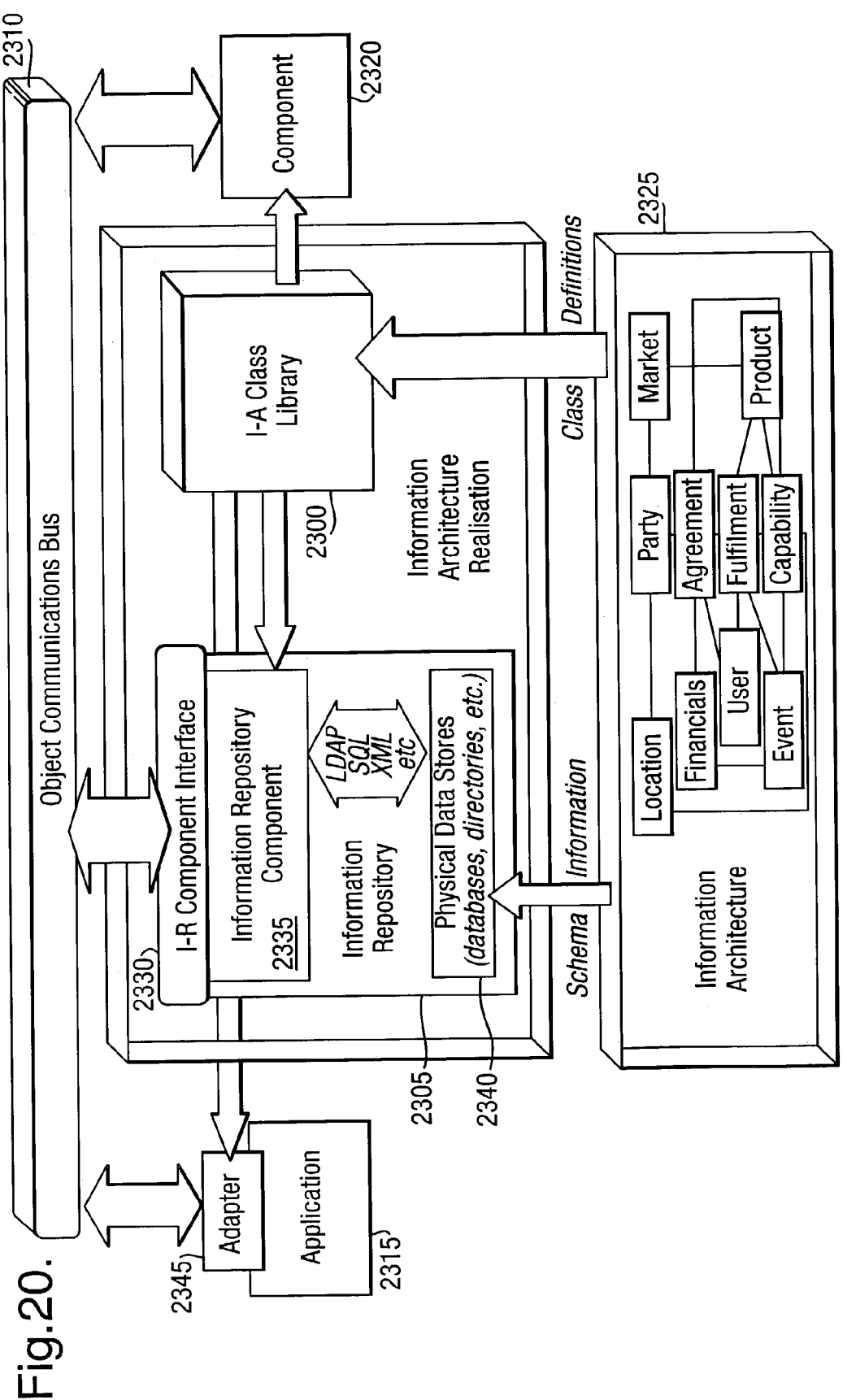
FIG. 20 shows schematically an implementation of an embodiment of the data management system.

Referring to FIG. 20, the information model can be realized within an implemented infrastructure through the utilization of class and schema definitions. This utilization centres around two realization components: the IA Class Library 2300 and the Information Repository (IR) 2305.

The applications 2315 and network components 2320 of the infrastructure, collectively referred to as Apps, interact with the IA objects stored in the Information Repository 2305 across an object communications bus 2310. The objects that the Apps reference are compatible because the objects are based on the class definitions from the IA Class Library 2300. The IA Class Library, in turn, reflects a common information definition that is used across the infrastructure, namely the Information model 2325. The IA objects belong to the Infrastructure and contain the rules that specify the details and extent of the integrity they require. These objects are deconstructed and the values are stored. When the objects are needed, the values are retrieved and the objects are reconstructed.

The Information Repository Component Interface (IR Component Interface) 2330 provides an object-oriented interface to the IA objects in the Information Repository Component (IR Component) 2335. The Apps use the interface to perform data manipulation functions against the data defined by the Information model 2325. The IR Component 2335 knows in which Physical Data Store 2340 the data resides and translates the function requested into a request to the appropriate Physical Data Store 2340 in the data stores native request language, such as SQL. Upon return of the request, the IR Component 2335 maps the result back to an object-oriented response.

Two modes of service are offered though the IR Component Interface 2330: intelligent service and simple data persistence. With the intelligent-service mode, the IA classes are instantiated in the IR Component 2335 and may be used in place through proxies. This promotes sharing among Apps and decreases their size and complexity. The objects may also be mirrored in the App or even sub-classed to conform to the specialized requirements of the App. The simple-data-persistence mode is limited to providing persistent storage and prompt retrieval of individual data values. This mode is intended to relieve Apps of the necessity of managing private data storage.

IA Class Library 2300

The IA Class Library 2300 is the keystone for realizing the Information model within the infrastructure. The class definitions from the Information model 2325 (and shown in FIG. 1) are catalogued in the IA Class Library. These definitions are used to build the Information Repository (IR) 2305 and are made available to the development community to aid in the construction of infrastructure components 2320 and the adapters 2345 that allow applications to participate in the infrastructure. This ensures that the classes used within the infrastructure and the object-oriented IR 2305 are compatible, and guarantees interoperability.

The attributes and methods associated with the classes in the IA Class Library 2300 constitute the IA information environment for the infrastructure. This information is documented in an IA data dictionary. The class implementations are provided as a code library. The services associated with the IA Class Library 2300 need to be supported during the design and development of the infrastructure to make the concept of the IR feasible. IA Class Library services include the provision of:

| Documentation | Standards | Manuals |
|---|---|---|
| Source Code | Library Source | Utilization Source |
| Complied Code | XML Definitions | |

The scope of the IA Class Library 2300 is limited to the Information model. Material regarding the development environment, OA&M, and installation is excluded as is material that is the exclusive concern of the Apps.

Information Repository 2305

The Information Repository encompasses and unifies, in so far as practical, all the data stores 2340 associated with the physical infrastructure that implements the Information model. The IR 2340 is responsible for insulating the other architecture components from the physical implementation of the information.

The architecture of the IR envisions two data situations. In the first, the data are directly associated with objects in the model 2325 (and shown in FIG. 1). Object persistence and build operations are done by the IR Component 2335, which also executes and enforces the integrity rules. Since the IR Component has access to the methods associated with the objects, it is in a position to offer many services in addition to maintaining integrity.

In the second situation, the data belongs to and is managed by the Apps 2315,2320. This data needs to be reconciled with the IA objects or with that of other Apps. As one cannot forbid Apps from communicating directly with one another, the best one can do is to provide a set of useful services, such as a data-location registry containing a protocol and data-model translation or a central control point for the enforcement of whatever integrity rules the Apps supply.

To accommodate these two situations, the IR 2305 has two different aspects:

Information Repository Component (IR Component) 2335 that provide storage, retrieval, direct interaction, and other data services through the IR Component Interface 2330 for objects defined in the Information model 2325. This corresponds to the first situation.

The Information Repository Service (IR-Service) that provides access to services associated with the Information Repository for Supplementary Data Stores (SDS). A SDS is a data store that may only be accessed through the applications that own it. Examples include data services provided by other components of infrastructure, or customer databases owned by third-party applications running on the infrastructure. This corresponds to the second situation.

A fundamental property of the Information Repository 2305 is that there are no back doors to databases. A database is controlled by the application that owns it and may only be accessed and coordinated with other databases through that application.

The Information Repository Component 2335

The IR Component 2335 plays a central role in realizing the Information model 2325 and shown in FIG. 1. It is responsible for insulating the Infrastructure Components 2320 from the physical data stores 2340, which provide the persistent storage needed by the Infrastructure. The IR Component 2335 accomplishes this by mapping the data attributes of the classes to the data elements in the physical storage. Both the class definitions and the schema definitions are used by the IR Component 2335 to create the mappings.

In the intelligent-service mode, the IR Component can provide referential integrity, run business rules, take part in transactions, administer and maintain policies and profiles, provide access through proxies, and otherwise take advantage of the behavior and intelligence built into the IA classes. This is because it has complete knowledge of the public instance variables, associations, public methods, and the APIs the IA classes expose to proxies through IDL (Interface Definition Language) interfaces. The proposed IR Component 2335 facilities to support the intelligent-service mode include:

| Storage | Access | Administration |
|---|---|---|
| Database Management | Security | Authorization |
| Integrity - Transactions | Audit Trails | History |
| Distribution | Load Balancing | Caching |
| Notification | Metrics (& Reports) | Maintenance |

The IR Component also supports facilities for the simple-data-persistence mode. These facilities, such as access control and audit trails, are those that can be implemented by attaching metadata to the values but require no knowledge of the relationships among stored values.

The Information Repository Services

The purpose of the IR Services is to assure that the data associated with the Infrastructure are consistent, to the extent that is practical given the capabilities of the underlying APIs of the Apps 2315/2320 that manage Supplementary Data Stores. The IR-Service provides a central framework based on the IA classes for maintaining Infrastructure Information that is outside the purview of the IR Component 2335. The need for doing this arises when independently developed databases are integrated into the Infrastructure. Synchronization becomes an issue for the following situations:

1. The data in the App's database changes, and the IR Component database needs to be updated.
2. The data in the IR Component database changes, and the App's database needs to be updated.
3. The data in an App's database changes, and the data in another App's database needs to be updated.
4. An App needs to read data from the database of another App.

These interactions require a knowledge of the data items in the Apps, the APIs (and protocols) of the Apps 2315/2320, the relationships among data items that need to be preserved in the Apps, and the actions that need to be taken to preserve integrity. To support these interactions, the Information Repository Service will need to provide:

- A common data language (CDL) for controlling and executing data exchange. A language such as XML is sufficient for exchanging data, however one may need additional language facilities to, for example, coordinate transactions.
- A mapping facility to equivalence the names the different Apps use to designate the same variable.
- A registry that identifies the App(s) that uses a variable. The registry may contain other information such as access permissions.
- Containers for the logic required to implement the interaction. Sub-classes of the IA classes are the containers of choice.

It will be understood that, in use, one of the purposes of a data management system built according to the data structures described above is to control the generation of information, for instance for output to a user or other system. In particular, it controls the sources for that information output and the way in which the information output is constructed. It introduces a time factor so that an information output may be different if constructed before a certain time rather than after a certain time and, in the case of a planned enterprise capability supporting product component fulfilment, it provides flexibility in the content of the information output in relation to time.

Within the data management system, the classes and their dependencies act in a manner analogous to network routing. If data is input to the system, the data management system effectively routes it to entities within the system which require the data, which will act on the data, and which together will generate an output dependent on the input data.

Class Dictionary

The class dictionary provides definitions for each of the object classes given in the model described above.

1. The Class Name column of the table contains the name of the class as it appears in the model.

Policy class names, designated in the diagrams with <<Policy>>, are in italics. Parameter Defined class names, designated in the diagrams with <<Parameter Defined>>, are underlined.

2. The Definition column contains a short explanation of the class. This may include an example and potential attributes.
3. The attributes assigned to each class represent a key set and not the definitive set. It is expected that in further refinements to this model, additional attributes may be identified.
4. All sub-classes inherit the attributes of the super-class.
5. The Notes column contains additional clarifying notes about the class, e.g. indicating that it's a sub-class of another listed class or that it is a placeholder.
6. All information classes have the following methods available: create—establishing an instance of the class; read—retrieving the values of the attributes of the instance; update—changing one or more values of the attributes of the instance; and delete—removing the instance of the class.

| Class Name | Definition | Notes |
|---|---|---|
| Access & Usage Rights | The set of conditions and actions that determine the rights of a User to | For details on policy class behaviour, see |
| Policy | use a Product Component Fulfilment. This policy is established as a result of an Agreement. | description above. |
| Access-Usage Rights Information | Information about a Product Component Fulfilment in the context of available capacity that is to be used in evaluating an Access & Usage Rights Policy. For example, total bandwidth utilised, the total mailbox space used, and number of users. | Sub-classes are required to model the information relevant to each Product Component Fulfilment. |
| Activity | Represents a discrete unit of work which may be carried out by a person or a machine. Attributes: Name Start date End Date Description Required Effort Dependency Associated Costs Required materials | A constituent class of Activity Program. This class may be extended through the use of sub-classes. Identified sub-classes are Human Activity and Machine Activity. |
| Activity Interaction | This is an abstract class that defines the relationship of one Activity to another Activity. For example one Activity may negate the need for another. Attributes: Priority Status | An interaction for the Activity - Activity relationship. |
| Activity Program | A planned collection of Activities which realise the capabilities of the enterprise Attributes: Program Name Program Description Effective Date Termination Date | This class may be extended through the use of sub-classes. Identified sub-classes are Order-Based Program, and Non-Order Program. |
| Activity Program Interaction | This is an abstract class that defines the relationship of one Activity Program to another Activity Program. For example one Activity Program may depend upon another one. Attributes: Priority Status | An interaction for the Activity Program - Activity Program relationship. |
| Agreement | A commercial arrangement between at least two Parties. Attributes: Effective Date Termination Date Signed Agreement Date Description Status | This class may be extended through the use of sub-classes. Identified sub-classes are Bid, Contract, and Order |
| Agreement Assignment | The designation of a Party to undertake the responsibilities of an Agreement Role. Attributes: Effective Date Termination Date Status {pending, active, temporary, . . . } | A RoleAssignment for the Party - Agreement Role relationship. |
| Agreement Interaction | This is an abstract class that defines the relationship of one Agreement to another Agreement. For example an Agreement may be revised and superseded by another one. | An interaction for the Agreement - Agreement relationship |
| Agreement Item | A line item within an Agreement indicating the selection of Marketplace Product to be purchased/supplied. Attributes: Quantity | A constituent class of Agreement. |
| Agreement Role | A responsibility that is defined within an Agreement e.g. signatory, customer, guarantor Attributes: | This class may be extended through the use of sub-classes. Identified |

-continued

| Class Name | Definition | Notes |
|---|---|---|
| | Type<br>Role Scope (responsibility)<br>Importance {mandatory, optional} | sub-classes are Customer, Supplier, Guarantor, and Distributor. |
| Component Selection | Represents the Product Component selected within a Product Selection. It is this Component Selection which is fulfilled by a Product Component Fulfilment.<br>Attributes:<br>Date Requested<br>Date Fulfilled | For details on parameter defined class behaviour, see description above. |
| Contained Component | Characterises the relationship between a Marketplace Product and its Product Components | Association Class for the Marketplace Product - Product Component relationship |
| Contract | A legally binding agreement to provide services and/or goods at a stated price.<br>Attribute:<br>Renewal Notification Date | A sub-class of Agreement. |
| Credential | Information about a User that is to be used in evaluating an Access & Usage Rights Policy. The information held depends on the particular security scheme employed.<br>Attributes:<br>Effective Timestamp<br>Termination Timestamp<br>Status | This class may be extended through the use of sub-classes to model the particular security scheme employed. Potential sub-classes are Password, Certificate, and LogName. |
| Customer | A role defined for an Agreement in which the Party acting in this role purchases services or goods from an other Party. | A sub-class of Agreement Role. |
| Customised Product | A type of Marketplace Product which has been tailored for a specific Party, group of Parties or a certain Market Segment.<br>Attributes:<br>Modification Date<br>Effective Date<br>Termination Date<br>Ramifications | A sub-class of Marketplace Product. |
| Distributor | A role defined for an Agreement. The Party acting in this role markets and sells services and goods to other Parties. For example, a wholesaler. | A sub-class of Agreement Role. |
| Enterprise Capability | Represents all the product-forming and product-impacting capabilities of the enterprise.<br>Attributes:<br>Capability Name<br>Description<br>Status {test, alpha, GA, . . . }<br>Effective Date<br>Termination Date | This class may be extended through the use of sub-classes. Identified sub-classes are Infrastructure Capability, Support Capability, and Consultation Capability. For details on parameter defined class behaviour, see description above. |
| Fulfilment Performance | A collection of events and troubles that are collected over a set period for the purpose of evaluating the performance of a Product Component Fulfilment against availability and quality metrics outlined by the Agreement Service Level Guarantee.<br>Attributes:<br>Date<br>Description<br>Period | This class would provide the information from which reports would be generated. |
| Generic | A standard (vanilla) product offered | A sub-class of |
| Product | to the marketplace. | Marketplace Product. |
| Guarantor | A role defined for an Agreement. The Party acting in this role guarantees payment for purchases of products or services by another Party. | A sub-class of Agreement Role. |
| Human Activity | An Activity that is performed by a human. | A sub-class of Activity. |
| Human Activity Role | The responsibility for managing an Activity | A RoleAssignment for the Activity/Party relationship. |
| Human Resource Capability | Represents the people available in the enterprise with specialised expertise, for customer assistance etc.<br>Attributes:<br>Name<br>Description<br>Type (Online, on premise, helpdesk)<br>Class (Premium, Standard, Best Effort)<br>Level<br>Availability (24 × 7 × 52, 8 × 5) | A sub-class of Enterprise Capability |
| Human Resource Capability Role | A role carried out in support of the Enterprise Capability. | An RoleAssignment for the Human Resource Capability/Party relationship. |
| Human Resource Capability Assignment | The responsibility for carrying out a specialist role in support of the Enterprise Capability. | An association class for Human Resource Capability and Party. |
| Human User | A User that is associated with the Individual subclass of Party. | A sub-class of User. |
| Individual | Unique identifier for that individual. | A sub-class of Party. See the Party & Party Identifier classes for details. |
| Infrastructure | A distinguishable collection of Managed System Elements which support the delivery of the Infrastructure Capability. e.g. the PSTN Platform which supports and delivers "telephony" capabilities.<br>Attributes:<br>Name<br>Description<br>Owner<br>Status | |
| Infrastructure Capability | Defines the specific capabilities that an Infrastructure can deliver. | A sub-class of Enterprise Capability. For details on parameter defined class behaviour, see description above. |
| Logical Device | An abstract class that represents an abstraction or emulation of a hardware entity that may or may not be realised in physical hardware. Any characteristics of a Logical Device are used to manage its operation or configuration contained in, or associated with, the Logical Device object. E.g. support for paper sizes and detection of errors in a printer is modeled in a Logical Device.<br>Attributes:<br>as defined by DMTF CIM v2.2 | Sub-class of Logical Element. From the DMTF CIM v2.2 model. Sub-classes include Power Supply, Modem, Controller, Printer, Battery, USB Device, Alarm Device, Scanner, Sensor, Cooling Device, Media Access Device, User Device, Network Adapter, Media Transfer Device, Logical Port |
| Logical Element | The base class of all components of a system that represent abstract functionality, such as, files, processes or | Sub-class of Managed System Element. From the |

-continued

| Class Name | Definition | Notes |
|---|---|---|
| | other system capabilities that can be modeled as a Logical Device.<br>Attributes:<br>as defined by DMTF CIM v2.2 | DMTF CIM v2.2 model. Sub-classes include Process, Logical File, Service Access Point, File System, Directory, Device File, Data File, Service, Software Feature, Software Element, Operating System, System, Computer System, Storage Library, Logical Device |
| Managed System Element (MSE) | This is the base class for the system element hierarchy. Membership Criteria: Any distinguishable component of a system is a candidate for inclusion in this class. Examples: software components, such as files; devices, such as disk drives and controllers; and physical components such as chips and cards. MSEs may be comprised of other MSEs<br>Attributes:<br>as defined by DMTF CIM v2.2 must also include 'Capacity' | From the DMTF CIM v2.2 model. Sub-classes include Logical Element and Physical Element. |
| MSE Assignment | A role assigned to a person to manage a Managed system Element. | A RoleAssignment for the MSE/Party relationship. |
| MSE Interaction | This is an abstract class that defines the relationship of one Managed System Element to another Managed System Element. For example one Managed System Element may be substituted for another one. | An interaction for the MSE - MSE relationship |
| MSE Role | A role assigned to a person or machine to manage an activity. | An association class for Party and MSE. |
| Marketing Campaign | A Marketing Campaign is the plan for delivery of a specific message to a segment of the community using suitable media.<br>Attributes:<br>Name<br>Description<br>Start Date<br>End Date | |
| Marketplace Product | A group of one or more Product Components offered together and priced as one unit according to Product Price Policy<br>Attributes:<br>Name<br>Description<br>Introduction Date<br>Sales Discontinuation Date<br>Support Discontinuation Date | This class may be extended through the use of sub-classes. Identified sub-classes are Generic Product and Customised Product. |
| Marketplace Product Interaction | This is an abstract class that defines the relationship of one Marketplace Product to another Marketplace Product. For example one Marketplace Product may be substituted for another one. | An interaction for the Marketplace Product - Marketplace Product relationship |
| Marketplace Product Role | A responsibility that is defined for a Marketplace Product. e.g. product manager, support manager<br>Attributes:<br>Role Name<br>Type<br>Role Function<br>Importance {mandatory, optional} | A constituent class of Marketplace Product. |
| MPP Assignment | The designation of a Party to undertake the responsibilities of a Marketplace Product Role.<br>Attributes:<br>Effective Date<br>Termination Date<br>Status {pending, active, temporary, . . . } | An RoleAssignment for the Party - Marketplace Product Role relationship. |
| Non-Human User | A User that is not human. For example, a telephone line or a system element. | A sub-class of User |
| Non-Order-Based Program | A type of Activity Program that delivers enhancements to Enterprise Capability which cannot be directly associated with a product selection. For example, the replacement of copper networks with fibre or Year 2000 activities. | A sub-class of Activity Program. |
| Organisation | A group of Individuals that functions as one autonomous unit for some purpose or work.<br>Attributes:<br>Name<br>Function Description | A sub-class of Party. This class may be extended through the use of sub-classes. Some potential sub-classes are Household, Corporation, Government Agency, and Non-profit. |
| Organisation Assignment | The designation of a Member to undertake the responsibilities of an Organisation Role.<br>Attributes:<br>Effective Date<br>Termination Date<br>Status {pending, active, temporary, . . . } | A RoleAssignment for the Member - Organisation Role relationship. |
| Organisation Role | A responsibility that is defined within an Organisation e.g. vice-president, manager, engineer, member.<br>Attributes:<br>Role Name<br>Type<br>Role Scope (responsibility)<br>Consideration {mandatory, optional} | A constituent class of Organisation. |
| Party | Party is an abstract class that encompasses both Organisation and Individual.<br>Attributes:<br>Party ID<br>Party Name<br>Legal Entity Status {no, yes}<br>Legal Entity Date<br>Commerce Credential<br>Credit Bureau Score<br>Credit Bureau Score Date<br>Credit Bureau Name | Sub-classes include Individual and Organisation. |
| Party Identifier | The ways of identifying a Party, including both unique and non-unique identifiers.<br>Names | May also include credentials that a party must have to be able to engage in commerce, such as tax ID, DUNS Number, SIC Code, Tax Exemption, mother's maiden name. |
| Physical Element | This class describes system components that have distinct physical manifestations Note that it is possible for a single Card - which is a type of Physical Element - to host more than one Logical Device. The card would be represented by a single Physical Element associated with multiple Logical Devices.<br>Attributes:<br>as defined by DMTF CIM v2.2 | A sub-class of Managed System Element. From the DMTF CIM v2.2 model. Sub-classes include Physical Link, Physical Connector, Physical Component, Physical Package, Card, Physical Frame, Chassis, Rack, Physical Media, |

-continued

| Class Name | Definition | Notes |
|---|---|---|
| Product Category | A generalised classification of product offered into the marketplace by market segment and/or the nature of the service e.g. IP Services, Telephony, Application Hosting. Attributes: Classification Type Description/Definition | Chip |
| Product Component | A cohesive unit of a deliverable product that has business and/or technical meaning (e.g. email service, address book) Attributes: Name Description Status {alpha, beta, GA, . . . } | A constituent class of Marketplace Product. A dependent class on Enterprise Capability. For details on parameter defined class behaviour, see description above. |
| Product Component Fulfilment | Represents the delivered product component. Attributes: Name Description Status {active, suspended, . . . } Availability Date | A constituent class of Product Selection. A dependent class on Product Component and Enterprise Capability. For details on parameter defined class behaviour, see description above. |
| Product Component Fulfilment Interaction | This is an abstract class that defines the relationship of one Product Component Fulfilment to another Product Component Fulfilment. Attributes: Effective Date Termination Date Status | An Interaction for the Product Component Fulfilment - Product Component Fulfilment relationship. |
| Product Component Interaction | This is an abstract class that defines the relationship of one Product Component to another Product Component. Attributes: Effective Date Termination Date Status | An Interaction for the Product Component - Product Component relationship. |
| Product Interaction | This is an abstract class that defines the relationship of one Marketplace Product to another Marketplace Product. Attributes: Effective Date Termination Date Status | An interaction for the Marketplace Product - Marketplace Product relationship. |
| Product Selection | Represents the Market Place Product selected in the Agreement. Attributes: Date Requested Date Fulfilled | An association class for the Marketplace Product - Agreement Item relationship |
| Product Substitution | Defines an allowed substitution of one Marketplace Product for another Marketplace Product. | A sub-class of Product Interaction |
| Supplier | A role defined for an Agreement. The Party acting in this role provides services or goods to another Party. | Sub-class of Agreement Role. |
| User | An entity that is authorised by an Agreement to register with and use the Product Component Fulfilment(s) covered by the Agreement. That entity may be associated with an individual, an organisation, or a managed system element. (see sub-classes). Attributes: User Identification Effective Date | A constituent class of User Group. This class may be extended through the use of sub-classes. Identified sub-classes are User Group, Human Use, and Non-Human User. |
| User Group | Termination Date A set of one or more Users that have a common set of Credentials, interact with the same Product Component Fulfilments, and are administered as a single User. A User Group may consist of any combination of Human Users, Non-Human Users, and User Groups. Attributes: Name Description Member Criteria | A sub-class of User. |
| User Session | Information about a specific User engagement with a Product Component Fulfilment. Attributes: Begin Timestamp End Timestamp Termination Reason Status | A constituent class of User-Fulfilment Relationship. |
| User-Fulfilment Relationship | Information about a User's association with a Product Component Fulfilment. Attributes: Registration Date Termination Date Status {active, suspended, . . . } | An association class for the User - Product Component Fulfilment relationship. |

What is claimed is:

1. A data management system, which receives and processes data in relation to one or more products, and records fulfilment of customer orders in respect of a generated product description, the system comprising:
   an input which receives-product selection data;
   a marketplace product store which stores marketplace product definitions;
   a product selection store which stores data defining a selection of one or more products from the marketplace product store;
   an enterprise capability store which stores data defining capability of an enterprise in relation to supply of one or more products; and
   a product fulfilment data store which stores one or more product descriptions and data related to the one or more product descriptions, the related data representing an event already done to fulfill a customer order;
   an association data store storing association data associating each product description with specified data in said enterprise capability store; and
   a product fulfilment data store controller arranged in operation to store a product description and related data representing an event already done to fulfill the customer order in said product fulfilment data store only when said enterprise capability store includes the specified data associated with said product description by said association data so that storage of the product description and the related data in the product fulfilment data store is prevented when said enterprise capability store does not include the specified data.

2. A system according to claim 1 wherein the specified data in the enterprise capability store relates to equipment necessary to support provision of a product identified in the product description.

3. A system according to claim 2 wherein a product description comprises date information, at least one set of data stored in the enterprise capability store comprises said specified data together with availability date data, and the system reviews the availability date data against the date information, such that a valid product description is dependent on compatibility between the availability date data and the date information.

4. A system according to claim 3 wherein said availability date data may be both compatible with the date information and in the future at the time that a product description is loaded to the product fulfilment data store.

5. A system according to claim 1 wherein the association data is updated in response to updates to the specified data in the enterprise capability store.

6. A system according to claim 1, wherein the specified data in the enterprise capability store comprises identifiers for instances of apparatus available to support a product identified in a product description.

7. A system according to claim 6 wherein the specified data in the enterprise capability store is updated and consequent changes made to data referencing said specified data.

8. A system according to claim 1 wherein said association data further comprises data associating each product description with specified data in said product selection store; and
    said product fulfilment data store controller is further arranged in operation to store a product description in said product fulfilment data store only when said product selection stored includes the specified data associated with said product description by said association data.

9. A method of managing data relating to product provision in relation to supporting capabilities, which method comprises:
    storing marketplace product definitions in a marketplace product store;
    receiving product selection data in relation to stored marketplace product definitions;
    storing data defining a selection of one or more products from the marketplace product store in a product selection store, in response to one or more received inputs;
    storing data defining capability of an enterprise in relation to supply of one or more products in an enterprise capability store;
    storing one or more product descriptions and data related to the one or more product descriptions, the related data representing an event already done to fulfill a customer order in a product fulfilment data store;
    generating association data associating each product description in the product fulfilment data store with specified data storable in the enterprise capability store; and
    selectively storing a product description and related data representing an event already done to fulfill the customer order in said product fulfilment data store by examining said association data to identify said associated specified data, and storing said product description and related data representing an event already done to fulfill the customer order only on said specified data being found in said enterprise capability store so that storage of the product description and the related data in the product fulfilment data store is prevented when said enterprise capability store does not include the specified data.

10. A system according to claim 1 wherein said association data further comprises data associating each marketplace product definition with specified data in said enterprise capability store; and
    the system further comprises a marketplace product store controller arranged in operation to store a marketplace product definition in said marketplace product store only when said enterprise capability store includes the specified data associated with said marketplace product definition by said association data.

11. A system according to claim 10 wherein any marketplace product definition stored in the marketplace product store is deleted in the event that t specified data for that marketplace product definition is no longer stored in the enterprise capability store.

12. A data management system, which receives and processes data in relation to one or more products, and recording fulfilment of customer orders in respect of a generated product description, the system comprising:
    an input which receives product selection data;
    a marketplace product store which stores marketplace product definitions;
    a product selection store which stores data defining a selection of one or more products from the marketplace product store;
    an enterprise capability store which stores data defining capability of an enterprise in relation to supply of one or more products; and
    a product fulfilled data store which stores one or more product descriptions;
    an association data store storing association data associating each product description with specified data in said enterprise capability store; and
    a product fulfilled data store controller arranged in operation to store a product description in said product fulfilled data store only when said enterprise capability store includes the specified data associated with said product description by said association data so that storage of the product description in said product fulfilled data store is prevented when said enterprise capability store does not include the specified data associated with said product description.

13. A system according to claim 12 wherein the specified data in the enterprise capability store relates to equipment necessary to support provision of a product identified in the product description.

14. A system according to claim 13 wherein a product description comprises date information, at least one set of data stored in the enterprise capability store comprises said specified data together with availability date data, and the system reviews the availability date data against the date information, such that a valid product description is dependent on compatibility between the availability date data and the date information.

15. A system according to claim 14 wherein said availability date data may be both compatible with the date information and in the future at the time that a product description is loaded to the product fulfilled data store.

16. A system according to claim 12 wherein the association data is updated in response to updates to the specified data in the enterprise capability store.

17. A system according to claim 12, wherein the specified data in the enterprise capability store comprises identifiers for instances of apparatus available to support a product identified in a product description.

18. A system according to claim 17 wherein the specified data in the enterprise capability store is updated and consequent changes made to data referencing said specified data.

19. A system according to claim 12 wherein said association data further comprises data associating each marketplace product definition with specified data in said enterprise capability store; and the system further comprises a marketplace product store controller arranged in operation to store a marketplace product definition in said marketplace product store only when said enterprise capability store includes the specified data associated with said marketplace product definition by said association data.

20. A system according to claim 19 wherein any marketplace product definition stored in the marketplace product store is deleted in the event that specified data for that marketplace product definition is no longer stored in the enterprise capability store.

21. A system according to claim 12 wherein said association data further comprises data associating each product description with specified data in said product selection store; and said product fulfilled data store controller is further arranged in operation to store a product description in said product fulfilled data store only when said product selection stored includes the specified data associated with said product description by said association data.

22. A method of managing data relating to product provision in relation to supporting capabilities, which method comprises:

storing marketplace product definitions in a marketplace product store;

receiving product selection data in relation to stored marketplace product definitions;

storing data defining a selection of one or more products from the marketplace product store in a product selection store, in response to one or more received inputs;

storing data defining capability of an enterprise in relation to supply of one or more products in an enterprise capability store;

storing one or more product descriptions in a product fulfilled data store; and generating association data associating each product description in the product fulfilled data store with specified data storable in the enterprise capability store; and selectively storing a product description in said product fulfilled data store by examining said association data to identify said associated specified data, and storing said product description only on said specified data being found in said enterprise capability store so that storage of the product description in said product fulfilled data store is prevented when said enterprise capability store does not include the specified data.

* * * * *